US008942917B2

(12) United States Patent
Chrysanthakopoulos

(10) Patent No.: US 8,942,917 B2
(45) Date of Patent: Jan. 27, 2015

(54) CHANGE INVARIANT SCENE RECOGNITION BY AN AGENT

(75) Inventor: Georgios Chrysanthakopoulos, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 264 days.

(21) Appl. No.: 13/026,300

(22) Filed: Feb. 14, 2011

(65) Prior Publication Data

US 2012/0209514 A1   Aug. 16, 2012

(51) Int. Cl.
*G06F 17/30* (2006.01)
*G06K 9/00* (2006.01)

(52) U.S. Cl.
CPC ........ *G06F 17/3079* (2013.01); *G06K 9/00671* (2013.01)
USPC ......................................................... 701/410

(58) Field of Classification Search
USPC ......................................................... 701/209
See application file for complete search history.

(56) References Cited

U.S. PATENT DOCUMENTS

| 4,627,620 | A | 12/1986 | Yang |
| 4,630,910 | A | 12/1986 | Ross |
| 4,645,458 | A | 2/1987 | Williams |
| 4,695,953 | A | 9/1987 | Blair |
| 4,702,475 | A | 10/1987 | Elstein |
| 4,711,543 | A | 12/1987 | Blair |
| 4,751,642 | A | 6/1988 | Silva |
| 4,796,997 | A | 1/1989 | Svetkoff |
| 4,809,065 | A | 2/1989 | Harris |
| 4,817,950 | A | 4/1989 | Goo |
| 4,843,568 | A | 6/1989 | Krueger |
| 4,893,183 | A | 1/1990 | Nayar |

(Continued)

FOREIGN PATENT DOCUMENTS

| CN | 101254344 | 6/2010 |
| EP | 0583061 | 2/1994 |

(Continued)

OTHER PUBLICATIONS

Kim, et al., "An Active Trinocular Vision System for Sensing Mobile Robot Navigation Environments", Retrieved at << http://koasas.kaist.ac.kr/bitstream/10203/1615/1/MYKim_IROS04_10_1.pdf >>, Proceedings IEEE/RSJ International Conference on Intelligent Robots and Systems, Sep. 28-Oct. 2, 2004, pp. 1698-1703.

(Continued)

*Primary Examiner* — Maceeh Anwari
(74) *Attorney, Agent, or Firm* — Steve Wight; Judy Yee; Micky Minhas

(57) ABSTRACT

A technology can be provided for change invariant scene recognition of an environment by an agent that uses image sensors to capture images. An example method can include grouping the images into situation image sets to form an image database. A navigation image can be captured by the agent at the agent's current location. Another operation can be searching through images by separately loaded situation image set to identify images that are a probable match for the navigation image. Error values can be computed between the navigation image and situation image sets. A probability can be calculated that situation image sets are to be used as a relevant situation image set based on the error values. Then the relevant situation image set can be searched for matching purposes with the navigation image while the error value is below a defined threshold.

20 Claims, 4 Drawing Sheets

(56) References Cited

U.S. PATENT DOCUMENTS

| | | |
|---|---|---|
| 4,901,362 A | 2/1990 | Terzian |
| 4,925,189 A | 5/1990 | Braeunig |
| 5,093,869 A | 3/1992 | Alves |
| 5,101,444 A | 3/1992 | Wilson et al. |
| 5,148,154 A | 9/1992 | MacKay |
| 5,184,295 A | 2/1993 | Mann |
| 5,229,754 A | 7/1993 | Aoki |
| 5,229,756 A | 7/1993 | Kosugi |
| 5,239,463 A | 8/1993 | Blair |
| 5,239,464 A | 8/1993 | Blair |
| 5,288,078 A | 2/1994 | Capper |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu |
| 5,405,152 A | 4/1995 | Katanics |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French |
| 5,495,576 A | 2/1996 | Ritchey |
| 5,516,105 A | 5/1996 | Eisenbrey |
| 5,524,637 A | 6/1996 | Erickson |
| 5,534,917 A | 7/1996 | MacDougall |
| 5,563,988 A | 10/1996 | Maes |
| 5,577,981 A | 11/1996 | Jarvik |
| 5,580,249 A | 12/1996 | Jacobsen |
| 5,594,469 A | 1/1997 | Freeman |
| 5,597,309 A | 1/1997 | Riess |
| 5,616,078 A | 4/1997 | Oh |
| 5,617,312 A | 4/1997 | Iura |
| 5,638,300 A | 6/1997 | Johnson |
| 5,641,288 A | 6/1997 | Zaenglein |
| 5,650,828 A | 7/1997 | Lee |
| 5,682,196 A | 10/1997 | Freeman |
| 5,682,229 A | 10/1997 | Wangler |
| 5,690,582 A | 11/1997 | Ulrich |
| 5,696,591 A | 12/1997 | Bilhorn |
| 5,699,444 A | 12/1997 | Palm |
| 5,703,367 A | 12/1997 | Hashimoto |
| 5,704,837 A | 1/1998 | Iwasaki |
| 5,715,834 A | 2/1998 | Bergamasco |
| 5,740,268 A | 4/1998 | Nishikawa |
| 5,745,126 A | 4/1998 | Jain |
| 5,751,831 A | 5/1998 | Ono |
| 5,825,922 A | 10/1998 | Pearson |
| 5,875,108 A | 2/1999 | Hoffberg |
| 5,877,803 A | 3/1999 | Wee et al. |
| 5,913,727 A | 6/1999 | Ahdoot |
| 5,926,568 A | 7/1999 | Chaney |
| 5,930,379 A | 7/1999 | Rehg |
| 5,930,392 A | 7/1999 | Ho |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov |
| 6,009,210 A | 12/1999 | Kang |
| 6,009,359 A | 12/1999 | El-Hakim |
| 6,054,991 A | 4/2000 | Crane |
| 6,057,909 A | 5/2000 | Yahav |
| 6,066,075 A | 5/2000 | Poulton |
| 6,072,494 A | 6/2000 | Nguyen |
| 6,073,489 A | 6/2000 | French |
| 6,077,201 A | 6/2000 | Cheng |
| 6,084,979 A | 7/2000 | Kanade |
| 6,094,508 A | 7/2000 | Acharya |
| 6,098,458 A | 8/2000 | French |
| 6,100,517 A | 8/2000 | Yahav |
| 6,100,896 A | 8/2000 | Strohecker |
| 6,101,289 A | 8/2000 | Kellner |
| 6,128,003 A | 10/2000 | Smith |
| 6,130,677 A | 10/2000 | Kunz |
| 6,141,463 A | 10/2000 | Covell |
| 6,147,678 A | 11/2000 | Kumar |
| 6,151,424 A | 11/2000 | Hsu |
| 6,152,838 A | 11/2000 | Killion |
| 6,152,856 A | 11/2000 | Studor |
| 6,159,100 A | 12/2000 | Smith |
| 6,173,066 B1 | 1/2001 | Peurach |
| 6,181,343 B1 | 1/2001 | Lyons |
| 6,188,777 B1 | 2/2001 | Darrell |
| 6,215,890 B1 | 4/2001 | Matsuo |
| 6,215,898 B1 | 4/2001 | Woodfill |
| 6,226,396 B1 | 5/2001 | Marugame |
| 6,229,913 B1 | 5/2001 | Nayar |
| 6,229,918 B1 | 5/2001 | Toyama |
| 6,256,033 B1 | 7/2001 | Nguyen |
| 6,256,400 B1 | 7/2001 | Takata |
| 6,283,860 B1 | 9/2001 | Lyons |
| 6,289,112 B1 | 9/2001 | Jain |
| 6,299,308 B1 | 10/2001 | Voronka |
| 6,308,565 B1 | 10/2001 | French |
| 6,316,934 B1 | 11/2001 | Amorai-Moriya |
| 6,363,160 B1 | 3/2002 | Bradski |
| 6,384,819 B1 | 5/2002 | Hunter |
| 6,405,151 B1 | 6/2002 | Fujii |
| 6,411,744 B1 | 6/2002 | Edwards |
| 6,430,997 B1 | 8/2002 | French |
| 6,476,834 B1 | 11/2002 | Doval |
| 6,496,598 B1 | 12/2002 | Harman |
| 6,498,628 B2 | 12/2002 | Iwamura |
| 6,502,515 B2 | 1/2003 | Burckhardt |
| 6,503,195 B1 | 1/2003 | Keller |
| 6,504,569 B1 | 1/2003 | Jasinschi |
| 6,516,099 B1 | 2/2003 | Davison |
| 6,539,931 B2 | 4/2003 | Trajkovic |
| 6,570,555 B1 | 5/2003 | Prevost |
| 6,603,880 B2 | 8/2003 | Sakamoto |
| 6,633,294 B1 | 10/2003 | Rosenthal |
| 6,640,202 B1 | 10/2003 | Dietz |
| 6,647,131 B1 | 11/2003 | Bradski |
| 6,661,918 B1 | 12/2003 | Gordon |
| 6,674,877 B1 | 1/2004 | Jojic |
| 6,681,031 B2 | 1/2004 | Cohen |
| 6,694,049 B1 | 2/2004 | Woodall |
| 6,711,293 B1 | 3/2004 | Lowe |
| 6,714,665 B1 | 3/2004 | Hanna |
| 6,731,799 B1 | 5/2004 | Sun |
| 6,738,066 B1 | 5/2004 | Nguyen |
| 6,741,756 B1 | 5/2004 | Toyama |
| 6,765,726 B2 | 7/2004 | French |
| 6,771,277 B2 | 8/2004 | Ohba |
| 6,781,618 B2 | 8/2004 | Beardsley |
| 6,788,809 B1 | 9/2004 | Grzeszczuk |
| 6,801,637 B2 | 10/2004 | Voronka |
| 6,850,635 B2 | 2/2005 | Gerard |
| 6,868,181 B1 | 3/2005 | Feiten et al. |
| 6,873,723 B1 | 3/2005 | Aucsmith |
| 6,876,496 B2 | 4/2005 | French |
| 6,879,709 B2 | 4/2005 | Tian |
| 6,937,742 B2 | 8/2005 | Roberts |
| 6,940,538 B2 | 9/2005 | Rafey |
| 6,941,321 B2 | 9/2005 | Schuetze |
| 6,950,534 B2 | 9/2005 | Cohen |
| 7,003,134 B1 | 2/2006 | Covell |
| 7,006,236 B2 | 2/2006 | Tomasi |
| 7,034,818 B2 | 4/2006 | Perry |
| 7,035,431 B2 | 4/2006 | Blake |
| 7,036,094 B1 | 4/2006 | Cohen |
| 7,038,855 B2 | 5/2006 | French |
| 7,039,239 B2 | 5/2006 | Loui |
| 7,039,676 B1 | 5/2006 | Day |
| 7,042,440 B2 | 5/2006 | Pryor |
| 7,050,177 B2 | 5/2006 | Tomasi |
| 7,050,606 B2 | 5/2006 | Paul |
| 7,058,204 B2 | 6/2006 | Hildreth |
| 7,060,957 B2 | 6/2006 | Lange |
| 7,098,435 B2 | 8/2006 | Mueller |
| 7,113,918 B1 | 9/2006 | Ahmad |
| 7,121,946 B2 | 10/2006 | Paul |
| 7,135,992 B2 | 11/2006 | Karlsson |
| 7,151,530 B2 | 12/2006 | Roeber |
| 7,158,680 B2 | 1/2007 | Pace |

(56) References Cited

U.S. PATENT DOCUMENTS

| | | |
|---|---|---|
| 7,167,578 B2 | 1/2007 | Blake |
| 7,170,492 B2 | 1/2007 | Bell |
| 7,184,048 B2 | 2/2007 | Hunter |
| 7,202,898 B1 | 4/2007 | Braun |
| 7,212,665 B2 | 5/2007 | Yang |
| 7,222,078 B2 | 5/2007 | Abelow |
| 7,224,384 B1 | 5/2007 | Iddan |
| 7,227,526 B2 | 6/2007 | Hildreth |
| 7,239,740 B1 | 7/2007 | Fujieda |
| 7,257,237 B1 | 8/2007 | Luck |
| 7,259,747 B2 | 8/2007 | Bell |
| 7,263,509 B2 | 8/2007 | Lee |
| 7,293,356 B2 | 11/2007 | Sohn |
| 7,308,112 B2 | 12/2007 | Fujimura |
| 7,310,431 B2 | 12/2007 | Gokturk |
| 7,317,836 B2 | 1/2008 | Fujimura |
| 7,324,671 B2 | 1/2008 | Li |
| 7,327,362 B2 | 2/2008 | Grau |
| 7,340,077 B2 | 3/2008 | Gokturk |
| 7,340,089 B2 | 3/2008 | Nair |
| 7,348,963 B2 | 3/2008 | Bell |
| 7,359,121 B2 | 4/2008 | French |
| 7,366,325 B2 | 4/2008 | Fujimura |
| 7,367,887 B2 | 5/2008 | Watabe |
| 7,376,246 B2 | 5/2008 | Shao |
| 7,379,563 B2 | 5/2008 | Shamaie |
| 7,379,566 B2 | 5/2008 | Hildreth |
| 7,389,591 B2 | 6/2008 | Jaiswal |
| 7,412,077 B2 | 8/2008 | Li |
| 7,421,093 B2 | 9/2008 | Hildreth |
| 7,430,312 B2 | 9/2008 | Gu |
| 7,436,496 B2 | 10/2008 | Kawahito |
| 7,450,736 B2 | 11/2008 | Yang |
| 7,451,123 B2 | 11/2008 | Platt |
| 7,452,275 B2 | 11/2008 | Kuraishi |
| 7,453,472 B2 | 11/2008 | Goede |
| 7,460,690 B2 | 12/2008 | Cohen |
| 7,489,812 B2 | 2/2009 | Fox |
| 7,519,206 B2 | 4/2009 | Mulet-Parada |
| 7,525,543 B2 | 4/2009 | Engel |
| 7,536,032 B2 | 5/2009 | Bell |
| 7,555,142 B2 | 6/2009 | Hildreth |
| 7,560,701 B2 | 7/2009 | Oggier |
| 7,570,805 B2 | 8/2009 | Gu |
| 7,574,020 B2 | 8/2009 | Shamaie |
| 7,576,727 B2 | 8/2009 | Bell |
| 7,583,275 B2 | 9/2009 | Neumann |
| 7,590,262 B2 | 9/2009 | Fujimura |
| 7,593,552 B2 | 9/2009 | Higaki |
| 7,598,942 B2 | 10/2009 | Underkoffler |
| 7,607,509 B2 | 10/2009 | Schmiz |
| 7,620,202 B2 | 11/2009 | Fujimura |
| 7,627,447 B2 | 12/2009 | Marsh |
| 7,648,460 B2 | 1/2010 | Simopoulos |
| 7,668,340 B2 | 2/2010 | Cohen |
| 7,680,298 B2 | 3/2010 | Roberts |
| 7,683,954 B2 | 3/2010 | Ichikawa |
| 7,684,592 B2 | 3/2010 | Paul |
| 7,697,748 B2 | 4/2010 | Dimsdale |
| 7,701,439 B2 | 4/2010 | Hillis |
| 7,702,130 B2 | 4/2010 | Im |
| 7,704,135 B2 | 4/2010 | Harrison, Jr. |
| 7,707,162 B2 | 4/2010 | Naphade |
| 7,710,391 B2 | 5/2010 | Bell |
| 7,728,839 B2 | 6/2010 | Yang |
| 7,729,530 B2 | 6/2010 | Antonov |
| 7,746,345 B2 | 6/2010 | Hunter |
| 7,760,182 B2 | 7/2010 | Ahmad |
| 7,809,167 B2 | 10/2010 | Bell |
| 7,834,846 B1 | 11/2010 | Bell |
| 7,852,262 B2 | 12/2010 | Namineni |
| 7,855,732 B2 | 12/2010 | Williams |
| 7,860,301 B2 | 12/2010 | Se |
| RE42,256 E | 3/2011 | Edwards |
| 7,898,522 B2 | 3/2011 | Hildreth |
| 7,925,081 B2 | 4/2011 | Gupta |
| 7,974,443 B2 | 7/2011 | Kipman |
| 8,009,880 B2 | 8/2011 | Zhang |
| 8,023,726 B2 | 9/2011 | Sundaresan |
| 8,031,909 B2 | 10/2011 | Se |
| 8,035,612 B2 | 10/2011 | Bell |
| 8,035,614 B2 | 10/2011 | Bell |
| 8,035,624 B2 | 10/2011 | Bell |
| 8,072,470 B2 | 12/2011 | Marks |
| 8,154,590 B2 | 4/2012 | Kressel |
| 8,270,733 B2 | 9/2012 | Cobb |
| 8,401,225 B2 | 3/2013 | Newcombe |
| 8,401,242 B2 | 3/2013 | Newcombe |
| 8,406,535 B2 | 3/2013 | Chrysanthakopoulos |
| 8,448,056 B2 | 5/2013 | Pulsipher |
| 2002/0024517 A1 | 2/2002 | Yamaguchi |
| 2002/0043632 A1 | 4/2002 | Miramonti |
| 2002/0069013 A1 | 6/2002 | Navab |
| 2002/0112024 A1 | 8/2002 | Yang |
| 2002/0168091 A1 | 11/2002 | Trajkovic |
| 2002/0186216 A1 | 12/2002 | Baumberg |
| 2003/0067461 A1 | 4/2003 | Fletcher |
| 2003/0221163 A1 | 11/2003 | Glover |
| 2004/0023612 A1 | 2/2004 | Kriesel |
| 2004/0075738 A1 | 4/2004 | Burke |
| 2004/0104935 A1 | 6/2004 | Williamson |
| 2004/0136583 A1 | 7/2004 | Harada |
| 2004/0167667 A1 | 8/2004 | Goncalves |
| 2004/0207597 A1 | 10/2004 | Marks |
| 2004/0233287 A1 | 11/2004 | Schnell |
| 2004/0239670 A1 | 12/2004 | Marks |
| 2005/0010445 A1 | 1/2005 | Krishnan |
| 2005/0059488 A1 | 3/2005 | Larsen |
| 2005/0152603 A1 | 7/2005 | Bober |
| 2005/0238200 A1 | 10/2005 | Gupta |
| 2006/0006309 A1 | 1/2006 | Dimsdale |
| 2006/0064017 A1 | 3/2006 | Krishnan |
| 2006/0110021 A1 | 5/2006 | Luo |
| 2006/0188144 A1 | 8/2006 | Sasaki |
| 2006/0221250 A1 | 10/2006 | Rossbach |
| 2006/0239553 A1 | 10/2006 | Florin |
| 2006/0239558 A1 | 10/2006 | Rafii |
| 2006/0252474 A1 | 11/2006 | Zalewski |
| 2006/0252475 A1 | 11/2006 | Zalewski |
| 2006/0252477 A1 | 11/2006 | Zalewski |
| 2006/0252541 A1 | 11/2006 | Zalewski |
| 2006/0262188 A1 | 11/2006 | Elyada |
| 2006/0268406 A1 | 11/2006 | McMaho et al. |
| 2007/0013718 A1 | 1/2007 | Ohba |
| 2007/0016418 A1 | 1/2007 | Mehrotra |
| 2007/0052807 A1 | 3/2007 | Zhou |
| 2007/0055153 A1 | 3/2007 | Simopoulos |
| 2007/0060336 A1 | 3/2007 | Marks |
| 2007/0070365 A1 | 3/2007 | Boregowda et al. |
| 2007/0081712 A1 | 4/2007 | Huang |
| 2007/0098222 A1 | 5/2007 | Porter |
| 2007/0116356 A1 | 5/2007 | Gong |
| 2007/0156286 A1 | 7/2007 | Yamauchi |
| 2007/0188501 A1 | 8/2007 | Yee |
| 2007/0216894 A1 | 9/2007 | Garcia |
| 2007/0217676 A1 | 9/2007 | Grauman |
| 2007/0260984 A1 | 11/2007 | Marks |
| 2007/0276214 A1 | 11/2007 | Dachille |
| 2007/0279485 A1 | 12/2007 | Ohba |
| 2007/0283296 A1 | 12/2007 | Nilsson |
| 2007/0298882 A1 | 12/2007 | Marks |
| 2008/0001951 A1 | 1/2008 | Marks |
| 2008/0009348 A1 | 1/2008 | Zalewski |
| 2008/0026838 A1 | 1/2008 | Dunstan |
| 2008/0027591 A1 | 1/2008 | Lenser |
| 2008/0037850 A1 | 2/2008 | Assmann |
| 2008/0055308 A1 | 3/2008 | Dekel |
| 2008/0060854 A1 | 3/2008 | Perlin |
| 2008/0062257 A1 | 3/2008 | Corson |
| 2008/0075361 A1 | 3/2008 | Winn |
| 2008/0075367 A1 | 3/2008 | Winn |
| 2008/0100620 A1 | 5/2008 | Nagai |
| 2008/0126937 A1 | 5/2008 | Pachet |
| 2008/0134102 A1 | 6/2008 | Movold |

(56) References Cited

U.S. PATENT DOCUMENTS

| | | |
|---|---|---|
| 2008/0137956 A1 | 6/2008 | Yang |
| 2008/0152191 A1 | 6/2008 | Fujimura |
| 2008/0152218 A1 | 6/2008 | Okada |
| 2008/0154565 A1 | 6/2008 | Florin |
| 2008/0215972 A1 | 9/2008 | Zalewski |
| 2008/0215973 A1 | 9/2008 | Zalewski |
| 2008/0304707 A1 | 12/2008 | Oi |
| 2008/0310677 A1 | 12/2008 | Weismuller |
| 2008/0310757 A1 | 12/2008 | Wolberg |
| 2008/0317331 A1 | 12/2008 | Winn |
| 2009/0003652 A1 | 1/2009 | Steinberg |
| 2009/0010507 A1 | 1/2009 | Geng |
| 2009/0027337 A1 | 1/2009 | Hildreth |
| 2009/0048482 A1 | 2/2009 | Hong |
| 2009/0066690 A1 | 3/2009 | Harrison |
| 2009/0066784 A1 | 3/2009 | Stone |
| 2009/0096807 A1 | 4/2009 | Silverstein |
| 2009/0141933 A1 | 6/2009 | Wagg |
| 2009/0158220 A1 | 6/2009 | Zalewski |
| 2009/0161968 A1 | 6/2009 | Chrysanthakopoulos |
| 2009/0161989 A1 | 6/2009 | Sim |
| 2009/0167679 A1 | 7/2009 | Klier |
| 2009/0175538 A1 | 7/2009 | Bronstein |
| 2009/0175540 A1 | 7/2009 | Dariush |
| 2009/0221368 A1 | 9/2009 | Yen |
| 2009/0231425 A1 | 9/2009 | Zalewski |
| 2009/0244097 A1 | 10/2009 | Estevez |
| 2009/0244309 A1 | 10/2009 | Maison |
| 2009/0252423 A1 | 10/2009 | Zhu |
| 2009/0279756 A1 | 11/2009 | Gindele |
| 2009/0290758 A1 | 11/2009 | Ng-Thow-Hing et al. |
| 2009/0290811 A1 | 11/2009 | Imai |
| 2009/0315978 A1 | 12/2009 | Würmlin |
| 2009/0324093 A1 | 12/2009 | Miarecki |
| 2010/0008581 A1 | 1/2010 | Bressan |
| 2010/0060632 A1 | 3/2010 | Lefevre |
| 2010/0080434 A1 | 4/2010 | Seifert |
| 2010/0085352 A1 | 4/2010 | Zhou |
| 2010/0085353 A1 | 4/2010 | Zhou |
| 2010/0093435 A1 | 4/2010 | Glaser |
| 2010/0094460 A1 | 4/2010 | Choi |
| 2010/0098328 A1 | 4/2010 | Se |
| 2010/0103196 A1 | 4/2010 | Kumar |
| 2010/0104184 A1 | 4/2010 | Bronstein |
| 2010/0111370 A1 | 5/2010 | Black |
| 2010/0124377 A1 | 5/2010 | Yu |
| 2010/0128112 A1 | 5/2010 | Marti |
| 2010/0195869 A1 | 8/2010 | Geiss |
| 2010/0197390 A1 | 8/2010 | Craig |
| 2010/0197393 A1 | 8/2010 | Geiss |
| 2010/0197400 A1 | 8/2010 | Geiss |
| 2010/0208035 A1 | 8/2010 | Pinault |
| 2010/0223276 A1 | 9/2010 | Al-Shameri |
| 2010/0260396 A1 | 10/2010 | Brandt |
| 2010/0262286 A1 | 10/2010 | Eidenberger et al. |
| 2010/0278384 A1 | 11/2010 | Shotton |
| 2010/0278420 A1 | 11/2010 | Shet |
| 2010/0281432 A1 | 11/2010 | Geisner |
| 2010/0289817 A1 | 11/2010 | Meier |
| 2010/0296724 A1 | 11/2010 | Chang |
| 2010/0302247 A1 | 12/2010 | Perez |
| 2010/0302395 A1 | 12/2010 | Mathe |
| 2010/0303289 A1 | 12/2010 | Polzin |
| 2011/0034244 A1 | 2/2011 | Marks |
| 2011/0085705 A1 | 4/2011 | Izadi |
| 2011/0170756 A1 | 7/2011 | Schneider |
| 2011/0210915 A1 | 9/2011 | Shotton |
| 2011/0234481 A1 | 9/2011 | Katz |
| 2011/0249865 A1 | 10/2011 | Lee |
| 2011/0254860 A1 | 10/2011 | Zontrop |
| 2011/0267344 A1 | 11/2011 | Germann |
| 2011/0306398 A1 | 12/2011 | Boch |
| 2012/0014559 A1 | 1/2012 | Suehling |
| 2012/0075343 A1 | 3/2012 | Chen |
| 2012/0128201 A1 | 5/2012 | Brickhill |
| 2012/0147152 A1 | 6/2012 | Vogiatis |
| 2012/0163656 A1 | 6/2012 | Wang |
| 2012/0163723 A1 | 6/2012 | Balan |
| 2012/0194516 A1 | 8/2012 | Newcombe et al. |
| 2012/0194517 A1 | 8/2012 | Izadi |
| 2012/0194644 A1 | 8/2012 | Newcombe |
| 2012/0194650 A1 | 8/2012 | Izadi |
| 2012/0196679 A1 | 8/2012 | Newcombe et al. |
| 2012/0269432 A1 | 10/2012 | Wang |

FOREIGN PATENT DOCUMENTS

| | | |
|---|---|---|
| JP | 08044490 | 2/1996 |
| JP | 2002-170122 | 6/2002 |
| JP | 2004-318879 | 11/2004 |
| JP | 2007-156626 | 6/2007 |
| KR | 10-2010-0131060 | 12/2010 |
| WO | 93/10708 | 6/1993 |
| WO | 97/17598 | 5/1997 |
| WO | 9724693 | 7/1997 |
| WO | 99/15863 | 4/1999 |
| WO | 99/44698 | 9/1999 |
| WO | 01/59975 | 8/2001 |
| WO | 02/082249 | 10/2002 |
| WO | 03/001722 | 1/2003 |
| WO | 03/046706 | 6/2003 |
| WO | 03/054683 | 7/2003 |
| WO | 03/071410 | 8/2003 |
| WO | 03/073359 | 9/2003 |
| WO | 2005038700 | 4/2005 |
| WO | 2009/059065 | 5/2009 |
| WO | 2009-131539 | 10/2009 |

OTHER PUBLICATIONS

Lowe, David G., "Object Recognition from Local Scale-Invariant Features", Retrieved at << http://citeseerx.ist.psu.edu/viewdoc/download?doi=10.1.1.21.1181&rep=rep1&type=pdf >>, International Conference on Computer Vision, Sep. 1999, pp. 1-8.

Otesteanu, et al., "3D Image Sensors, an Overview", Retrieved at << http://www.wseas.us/e-library/transactions/electronics/2008/Editor%20Paper%20OTESTEANU.PDF >>, WSEAS Transactions on Electronics, vol. 5, No. 3, Mar. 2008, pp. 53-56.

Foix, et al., "Exploitation of Time-of-Flight (ToF) Cameras", Retrieved at << http://upcommons.upc.edu/e-prints/bitstream/2117/8223/1/1113-Exploitation-of-Time-of-Flight-%28ToF%29-cameras.pdf >>, Technical Report, IRI-TR-10-07, 2007, pp. 22.

Basri, et al., "Visual Homing: Surfing on the Epipoles", Retrieved at << http://www.springerlink.com/content/h87103p563507v63/fulltext.pdf >>, International Journal of Computer Vision, vol. 33, No. 2, 1999, pp. 117-137.

Buchanan, et al., "Interactive Feature Tracking using K-D Trees and Dynamic Programming", Retrieved at << http://ieeexplore.ieee.org/stamp/stamp.jsp?tp=&arnumber=1640813 >>, IEEE Computer Society Conference on Computer Vision and Pattern Recognition, Jun. 17-22, 2006, pp. 8.

Burgard, et al., "Estimating the Absolute Position of a Mobile Robot using Position Probability Grids", Retrieved at << http://citeseerx.ist.psu.edu/viewdoc/download?doi=10.1.1.31.7646&rep=rep1&type=pdf >>, Feb. 5, 1996, pp. 1-15.

Cummins, et al., "FAB-MAP: Probabilistic Localization and Mapping in the Space of Appearance", Retrieved at << http://www.robots.ox.ac.uk/~mobile/Papers/IJRR_2008_FabMap.pdf >>, International Journal of Robotics Research vol. 27, No. 6, Jun. 2008, pp. 647-665.

Dellaert, et al., "Monte Carlo Localization for Mobile Robots", Retrieved at << http://tiger.ece.stevens-tech.edu/grp16/hw7_paper5_localization-monte-carlo.pdf >>, IEEE International Conference on Robotics and Automation (ICRA99), May 1999, pp. 1322-1328.

Durrant-Whyte, et al., "Simultaneous Localisation and Mapping (Slam): Part I The Essential Algorithms", Retrieved at << http://citeseerx.ist.psu.edu/viewdoc/download?doi=10.1.1.128.4195&rep=rep1&type=pdf >>, IEEE Robotics and Automation Magazine, vol. 2, 2006, pp. 1-9.

(56) References Cited

OTHER PUBLICATIONS

Foka, et al., "Real-time Hierarchical Pomdps for Autonomous Robot Navigation", Retrieved at << http://citeseerx.ist.psu.edu/viewdoc/download?doi=10.1.1.59.7885&rep=rep1&Type=pdf >>, Technical Report, ICS-TR347, Jan. 2005, pp. 47.

Harris, et al., "A Combined Corner and Edge Detector", Retrieved at << http://www.bmva.org/bmvc/1988/avo-88-023.pdf >>, Proceedings of the 4th Alvey Vision Conference, 1988, pp. 147-152.

Kang, et al., "Image Matching in Large Scale Indoor Environment", Retrieved at << http://ieeexplore.ieee.org/stamp/stamp.jsp?tp=&arnumber=5204357 >>, IEEE Computer Society Conference on Computer Vision and Pattern Recognition (CVPR) Workshop on Egocentric Vision, Jun. 2009, pp. 33-40.

Kortenkamp, et al., "Topological Mapping for Mobile Robots using a Combination of Sonar and Vision Sensing", Retrieved at << http://www.aaai.org/Papers/AAI/1994/AAAI94-150.pdf >>, In AAAI Proceedings of the twelfth national conference on Artificial intelligence, vol. 2, 1994, pp. 979-984.

Kröse, et al., "A Probabilistic Model for Appearance-based Robot Localization", Retrieved at << http://citeseerx.ist.psu.edu/viewdoc/download?doi=10.1.1.4.8627&rep=rep1&type=pdf >>, Image and Vision Computing, vol. 19, No. 6, Apr. 25, 2001, pp. 381-391.

Lowe, David G., "Distinctive Image Features from Scale-invariant Keypoints", Retrieved at << http://www.springerlink.com/content/h4l02691327px768/fulltext.pdf >>, International Journal of Computer Vision, vol. 60, No. 2, Nov. 2004, pp. 91-110.

Matas, et al., "Robust Wide Baseline Stereo from Maximally Stable Extremal Regions", Retrieved at << http://cmp.felk.cvut.cz/~matas/papers/matas-bmvc02.pdf >>, In British Machine Vision Conference, vol. 1, 2002, pp. 384-393.

Matsumoto, et al., "View-based Approach to Robot Navigation", Retrieved at << http://ieeexplore.ieee.org/stamp/stamp.jsp?tp=arnumber=895217 >>, Proceedings IEEE/RSJ International Conference on Intelligent Robots and Systems, 2000, pp. 1702-1708.

Mikolajczyk, et al., "An Affine Invariant Interest Point Detector", Retrieved at << http://citeseerx.ist.psu.edu/viewdoc/download?doi=10.1.1.19.4779&rep=rep1&type=pdf >>, Proceedings European Conference Computer Vision, 2002, pp. 15.

Nicolescu, et al., "Experience-based Representation Construction: Learning from Human and Robot Teachers", Retrieved at << http://citeseerx.ist.psu.edu/viewdoc/download?doi=10.1.1.29.1840&rep=rep1&type=pdf >>, In Proceedings IEEE/RSJ International Conference on Intelligent Robots and Systems, Oct. 29-Nov. 3, 2001, pp 6.

Nistér, et al., "Scalable Recognition with a Vocabulary Tree", Retrieved at << http://ieeexplore.ieee.org/stamp/stamp.jsp?tp=&arnumber=1641018 >>, In IEEE Conference on Computer Vision and Pattern Recognition (CVPR), vol. 2, Jun. 2006, pp. 8.

Oliva, et al., "Building the Gist of a Scene: The Role of Global Image Features in Recognition", Retrieved at << http://cvcl.mit.edu/Papers/OlivaTorralbaPBR2006.pdf >>, Progress in brain research, vol. 155, 2006, pp. 23-26.

Porta, et al., "Active Appearance-based Robot Localization using Stereo Vision", Retrieved at << http://citeseerx.ist.psu.edu/viewdoc/download?doi=10.1.1.74.8903&rep=rep1&type=pdf >>, Autonomous Robots, vol. 18, No. 1, Jan. 2005, pp. 1-28.

Smallwood, et al., "The Optimal Control of Partially Observable Markov Processes over a Finite Horizon", Retrieved at << http://or.journal.informs.org/cgi/content/abstract/21/5/1071 >>, Operations Research vol. 21, No. 5, Sep.-Oct. 1973, pp. 3.

Rosten, et al., "Fusing Points and Lines for High Performance Tracking", Retrieved at << http://mi.eng.cam.ac.uk/~er258/work/rosten_2005_tracking.pdf >>, Tenth IEEE International Conference on Computer Vision, Oct. 17-21, 2005, pp. 8.

Spaan, et al., "A Point-based POMDP Algorithm for Robot Planning", Retrieved at << http://citeseerx.ist.psu.edu/viewdoc/download?doi=10.1.1.10.9723&rep=rep1&type=pdf >>, Proceedings ICRA IEEE International Conference on Robotics and Automation, Apr. 26-May 1, 2004, pp. 6.

Theocharous, et al., "Learning Hierarchical Partially Observable Markov Decision Process Models for Robot Navigation", Retrieved at << http://citeseerx.ist.psu.edu/viewdoc/download?doi=10.1.1.28.3557&rep=rep1&type=pdf >>, 2001, pp. 1-6.

Ulrich, et al., "Appearance-based Place Recognition for Topological Localization", Retrieved at << http://citeseerx.ist.psu.edu/viewdoc/download?doi=10.1.1.34.7387&rep=rep1&type=pdf >>, IEEE International Conference on Robotics and Automation, Apr. 2000, pp. 7.

Wilson, Andrew D., "Depth-sensing Video Cameras for 3d Tangible Tabletop Interaction", Retrieved at << http://ieeexplore.ieee.org/stamp/stamp.jsp?tp=arnumber=4384131 >>, Second Annual IEEE International Workshop on Horizontal Interactive Human-Computer Systems (TABLETOP), Oct. 10-12, 2007, pp. 201-204..

Chen, "Model Based Object Recognition by Robust Information Fusion", Proceedings of the 17th International Conference on Pattern Recognition, Aug. 23-26, 2004.

Forahobby, "How You Become the Controller with Xbox 360 Kinect", Jan. 11, 2011.

Raca, "Improving 3D Human Pose Estimation", Jul. 4, 2011.

PCT International Search Report and Written Opinion for Application No. PCT/US2012/062875, Reference 333852-02, Mar. 25, 2013.

EP Communication for Application No. 12 190 592.1-1908, Reference 10816.1209, Apr. 10, 2013.

EP Communication for Application No. 12 190 592.1-1908, Reference 10816.1209, Mar. 28, 2013.

Kalpathy-Cramer, "Medical Image Retrieval and Automatic Annotation: OHSU at ImageCLEF 2007", Proceedings of the 8th Workshop of the Cross-Language Evaluation Forum, Sep. 19-21, 2007.

Jablonski, "Process Oriented Knowledge Management to Support Clinical Pathway Execution", Proceedings of the Workshop on Current Aspects of Knowledge Management in Medicine, Apr. 11-13, 2005.

Jung, "A Framework of Context-Sensitive Visualization for User-Centered Interactive Systems", Proceedings of the 10th International Conference on User Modeling, Jul. 24-29, 2005.

Klimov, "A Framework for Intelligent Visualization of Multiple Time-Oriented Medical Records", Proceedings of the American Medical Informatics Association Annual Symposium, Nov. 30-Dec. 1, 2005.

Moreno, "A Contextual Medical Image Viewer", IEEE Transactions on Information Technology in Biomedicine, Sep. 2007.

Shahar, "Knowledge-Based Visualization of Time-Oriented Clinical Data", Proceedings of the American Medical Informatics Association Annual Symposium, Nov. 7-11, 1998.

Zhou, "Semantics and CBIR: A Medical Imaging Perspective", Proceedings of the ACM International Conference on Image and Video Retrieval, Jul. 7-9, 2008.

Bichsel, "Illumination Invariant Object Recognition", Proceedings of the International Conference on Image Processing, Oct. 23-26, 1995.

Keil, "Gradient Representation and Perception in the Early Visual System—A Novel Account of Mach Band Formation", Vision Research, Sep. 2006.

CN Notice on the First Office Action for Application No. 200880123196.6, Nov. 9, 2011.

CN Notice on the Second Office Action for Application No. 200880123196.6, Apr. 13, 2012.

CN Notice on the Third Office Action for Application No. 200880123196.6, Jul. 26, 2012.

JP Notice of Rejection for Application No. 2010-539917, Aug. 3, 2012. (Previously Cited as: Official Action dated Aug. 6, 2012).

Kobayashi, "Automatic Generation of Image-Retrieval Algorithm Corresponding to Query Keywords", The Institute of Image Information and Television Engineers, Nov. 20, 2000.

PCT International Search Report and Written Opinion for Application No. PCT/US2008/087866, May 21, 2009.

PCT International Search Report and Written Opinion for Application No. PCT/US2012/020686, Aug. 22, 2012.

"Ray Casting" Wikipedia, Feb. 5, 2008.

Andoni, "Near-Optimal Hashing Algorithms for Approximate Nearest Neighbor in High Dimensions", Communications of the ACM, Jan. 2008.

(56) References Cited

OTHER PUBLICATIONS

Brunelli, "Histograms Analysis for Image Retrieval", Pattern Recognition, Aug. 2001.
Cao, "Spatial-Bag-of-Features", Proceedings of the IEEE Conference on Computer Vision and Pattern Recognition, Jun. 13-18, 2010.
Chum, "Total Recall: Automatic Query Expansion With a Generative Feature Model for Object Retrieval", Proceedings of the IEEE International Conference on Computer Vision, Oct. 14-21, 2007.
Freund, "An Efficient Boosting Algorithm for Combining Preferences", Journal of Machine Learning Research, Nov. 2003.
Grauman, "The Pyramid Match Kernel: Discriminative Classification With Sets of Image Features", Proceedings of the 10th IEEE International Conference on Computer Vision, Oct. 17-20, 2005.
Gudivada, "θr-String: A Geometry-Based Representation for Efficient and Effective Retrieval of Images by Spatial Similarity", IEEE Transactions on Knowledge and Data Engineering, May 1998.
Jegou, "Packing Bag-of-Features", Proceedings of the IEEE International Conference on Computer Vision, Sep. 27-Oct. 4, 2009.
Lazebnik, "Beyond Bags of Features: Spatial Pyramid Matching for Recognizing Natural Scene Categories", Proceedings of the IEEE Computer Society Conference on Computer Vision and Pattern Recognition, Jun. 17-22, 2006.
Liu, "Integrated Feature Selection and Higher-Order Spatial Feature Extraction for Object Categorization", Proceedings of the IEEE Conference on Computer Vision and Pattern Recognition, Jun. 23-28, 2008.
Marszalek, "Spatial Weighting for Bag-of-Features", Proceedings of the IEEE Computer Society Conference on Computer Vision and Pattern Recognition, Jun. 17-22, 2006.
Mikolajczyk, "Scale & Affine Invariant Interest Point Detectors", International Journal of Computer Vision, Oct. 2004.
Perd'Och, "Efficient Representation of Local Geometry for Large Scale Object Retrieval", Proceedings of the IEEE Computer Society Conference on Computer Vision and Pattern Recognition, Jun. 20-25, 2009.
Philbin, "Object Retrieval with Large Vocabularies and Fast Spatial Matching", Proceedings of the IEEE Computer Society Conference on Computer Vision and Pattern Recognition, Jun. 17-22, 2007.
Philbin, "Lost in Quantization: Improving Particular Object Retrieval in Large Scale Image Databases", Proceedings of the IEEE Computer Society Conference on Computer Vision and Pattern Recognition, Jun. 24-26, 2008.
Sivic, "Video Google: A Text Retrieval Approach to Object Matching in Videos", Proceedings of the 9th IEEE International Conference on Computer Vision, Oct. 14-17, 2003.
Wu, "Bundling Features for Large Scale Partial-Duplicate Web Image Search", Proceedings of the IEEE Computer Society Conference on Computer Vision and Pattern Recognition, Jun. 20-25, 2009.
Zhang, "Descriptive Visual Words and Visual Phrases for Image Applications", Proceedings of the ACM International Conference on Multimedia, Oct. 19-24, 2009.
Zhang, "Efficient Indexing for Large Scale Visual Search", Proceedings of the 12th IEEE International Conference on Computer Vision, Sep. 27 -Oct. 04, 2009.
Kanade, "A Stereo Machine for Video-Rate Dense Depth Mapping and Its New Applications", IEEE Computer Society Conference on Computer Vision and Pattern Recognition, Jun. 18-20, 1996.
Miyagawa, "CCD-Based Range-Finding Sensor", IEEE Transactions on Electron Devices, Oct. 1997.
Rosenhahn, "Automatic Human Model Generation", Computer Analysis of Images and Patterns, Sep. 5-8, 2005.
Aggarwal, "Human Motion Analysis: A Review", IEEE Nonrigid and Articulated Motion Workshop, Jun. 16, 1997.
Shao, "An Open System Architecture for a Multimedia and Multimodal User Interface", Aug. 24, 1998.
Kohler, "Special Topics of Gesture Recognition Applied in Intelligent Home Environments", In Proceedings of the Gesture Workshop, Sep. 17-19, 1997.
Kohler, "Vision Based Remote Control in Intelligent Home Environments", 1996.
Kohler, "Technical Details and Ergonomical Aspects of Gesture Recognition applied in Intelligent Home Environments", 1997.
Hasegawa, "Human-Scale Haptic Interaction with a Reactive Virtual Human in a Real-Time Physics Simulator", ACM Computers in Entertainment, Jul. 2006.
Qian, "A Gesture-Driven Multimodal Interactive Dance System", IEEE International Conference on Multimedia and Expo, Jun. 27-30, 2004.
Zhao, "Dressed Human Modeling, Detection, and Parts Localization", Jul. 26, 2001.
He, "Generation of Human Body Models", Apr. 2005.
Isard, "Condensation—Conditional Density Propagation for Visual Tracking", International Journal of Computer Vision, Aug. 1998.
Livingston, "Vision-based Tracking with Dynamic Structured Light for Video See-through Augmented Reality", 1998.
Wren, "Pfinder: Real-Time Tracking of the Human Body", IEEE Transactions on Pattern Analysis and Machine Intelligence, Jul. 1997.
Breen, "Interactive Occlusion and Collision of Real and Virtual Objects in Augmented Reality", European ComputerIndustry Research Centre GmbH, 1995.
Freeman, "Television Control by Hand Gestures", Proceedings of the IEEE International Workshop on Automatic Face and Gesture Recognition, Jun. 1995.
Hongo, "Focus of Attention for Face and Hand Gesture Recognition Using Multiple Cameras", 4th IEEE International Conference on Automatic Face and Gesture Recognition, Mar. 26-30, 2000.
Pavlovic, "Visual Interpretation of Hand Gestures for Human-Computer Interaction: A Review", IEEE Transactions on Pattern Analysis and Machine Intelligence, Jul. 1997.
Azarbayejani, "Visually Controlled Graphics", IEEE Transactions on Pattern Analysis and Machine Intelligence, Jun. 1993.
Granieri, "Simulating Humans in VR", The British Computer Society, Oct. 12, 1994.
Brogan, "Dynamically Simulated Characters in Virtual Environments", IEEE Computer Graphics and Applications, Sep. 1998.
Fisher, "Virtual Environment Display System", ACM Workshop on Interactive 3D Graphics, Oct. 23-24, 1986.
"Virtual High Anxiety", Tech Update, Aug. 1995.
Sheridan, "Virtual Reality Check", Technology Review, Oct. 1993.
Stevens, "Flights into Virtual Reality Treating Real World Disorders", The Washington Post, Mar. 27, 1995.
"Simulation and Training", Division Incorporated, 1994.
Zhou, "Data-Parallel Octrees for Surface Reconstruction", IEEE Transactions on Visualization and Computer Graphics, May 2011.
Zhou, "Highly Parallel Surface Reconstruction", Apr. 2008.
Zach, "A Globally Optimal Algorithm for Robust TV-L Range Image Integration", Proceedings of the IEEE 11th International Conference on Computer Vision, Oct. 14-21, 2007.
Parker, "Interactive Ray Tracing for Isosurface Rendering", Proceedings of the IEEE Computer Society Conference on Visualization, Oct. 18-23, 1998.
Newcombe, "Live Dense Reconstruction With a Single Moving Camera", Proceedings of the IEEE Computer Society Conference on Computer Vision and Pattern Recognition, Jun. 13-18, 2010.
Levoy, "The Digital Michelangelo Project: 3D Scanning of Large Statues", ACM SIGGRAPH, Proceedings of the International Conference on Computer Graphics and Interactive Techniques, Jul. 23-28, 2000.
Hadwiger, "Advanced Illumination Techniques for GPU-Based vol. Raycasting", ACM SIGGRAPH, Proceedings of the International Conference on Computer Graphics and Interactive Techniques, Aug. 3-7, 2009.
Harada, "Real-Time Rigid Body Simulation on GPUs", GPU Gems 3, Chapter 29, Aug. 12, 2007.
Elfes, "Sensor Integration for Robot Navigation: Combining Sonar and Stereo Range Data in a Grid-Based Representation", Proceedings of the 28th Conference on Decision and Control, Dec. 1987.
"Matt Cutts: Gadgets, Google, and SEO: What Would You Do if You Were CEO of Google?", Nov. 18, 2010.
Chen, "Object Modeling by Registration of Multiple Range Images", Proceedings of the IEEE International Conference on Robotics and Automation, Apr. 1991.

(56) References Cited

OTHER PUBLICATIONS

Blais, "Registering Multiview Range Data to Create 3D Computer Objects", IEEE Transactions on Pattern Analysis and Machine Intelligence, Aug. 1995.
Yu, "Monocular Video Foreground/Background Segmentation by Tracking Spatial-Color Gaussian Mixture Models", IEEE Workshop on Motion and Video Computing, Feb. 23-24, 2007.
Wurm, "OctoMap: A Probabilistic, Flexible, and Compact 3D Map Representation for Robotic Systems", Proceedings of the Workshop on Best Practice in 3D Perception and Modeling for Mobile Manipulation (ICRA), Oct. 2010.
Wilson, "Combining Multiple Depth Cameras and Projectors for Interactions on, Above, and Between Surfaces", ACM Symposium on User Interface Software and Technology, Oct. 3-6, 2010.
Williams, "Real-Time Slam Relocalisation", Proceedings of the IEEE 11th International Conference on Computer Vision, Oct. 14-21, 2007.
Van Dam, "Immersive VR for Scientific Visualization: A Progress Report", IEEE Computer Graphics and Applications, Nov. 2000.
Welch, "Motion Tracking: No Silver Bullet, But a Respectable Arsenal", IEEE Computer Graphics and Applications, Nov. 2002.
Vogiatzis, "Reconstructing Relief Surfaces", Proceedings of the British Machine Vision Conference, Sep. 7-9, 2004.
Vidal, "Pursuit-Evasion Games with Unmanned Ground and Aerial Vehicles", Proceedings of the IEEE International Conference on Robotics and Automation, May 21-26, 2001.
Vaughan-Nichols, "Game-Console Makers Battle Over Motion-Sensitive Controllers", Technology News, Aug. 2009.
Thrun, "Probabilistic Robotics", Chapters 9-10, Mit Press, Aug. 2005.
Stuhmer, "Real-Time Dense Geometry from a Handheld Camera", Proceedings of the 32nd Annual Symposium of the German Association for Pattern Recognition, Sep. 22-24, 2010.
Purcell, "Ray Tracing on Programmable Graphics Hardware", ACM Transactions on Graphics, Jul. 2002.
Stein, "Structural Indexing: Efficient 3-D Object Recognition", IEEE Transactions on Pattern Analysis and Machine Intelligence, Feb. 1992.
Seitz, "A Comparison and Evaluation of Multi-View Stereo Reconstruction Algorithms", Proceedings of the IEEE Computer Society Conference on Computer Vision and Pattern Recognition, Jun. 17-22, 2006.
Rusinkiewicz, "Real-Time 3D Model Acquisition", Proceedings of the 29th Annual Conference on Computer Graphics and Interactive Techniques, Jul. 21-26, 2002.
Pollefeys, "Detailed Real-Time Urban 3D Reconstruction From Video", International Journal of Computer Vision, Jul. 2008.
Osher, "Level Set Methods and Dynamic Implicit Surfaces", Chapter 2, Oct. 31, 2002.
Molchanov, "Non-Iterative Second-Order Approximation of Signed Distance Functions for Any Isosurface Representation", Eurographics/IEEE-VGTC Symposium on Visualization, Jun. 9-11, 2010.
Michel, "GPU-Accelerated Real-Time 3D Tracking for Humanoid Locomotion and Stair Climbing", Proceedings of the IEEE/RSJ International Conference on Intelligent Robots and Systems, Oct. 29-Nov. 2, 2007.
Lorensen, "Marching Cubes: A High Resolution 3D Surface Construction Algorithm", Computer Graphics, Jul. 1987.
Le Grand, "Broad-Phase Collision Detection With Cuda", GPU Gems 3, Chapter 32, Aug. 12, 2007.
Klein, "Parallel Tracking and Mapping for Small AR Workspaces", Proceedings of the 6th IEEE and ACM International Symposium on Mixed and Augmented Reality, Nov. 13-16, 2007.
Kim, "Relocalization Using Virtual Keyframes For Online Environment Map Construction", Proceedings of the 16th ACM Symposium on Virtual Reality and Software Technology, Nov. 18-20, 2009.
Kil, "GPU-Assisted Surface Reconstruction on Locally-Uniform Samples", Proceedings of the 17th International Meshing Roundtable, Oct. 12-15, 2008.
Kazhdan, "Poisson Surface Reconstruction", Proceedings of the 4th Eurographics Symposium on Geometry Processing, Jun. 26-28, 2006.
Jivet, "Real Time Representation of 3D Sensor Depth Images", WSEAS Transactions on Electronics, Mar. 2008.
Hogue, "Underwater Environment Reconstruction Using Stereo and Inertial Data", Proceedings of the IEEE International Conference on Systems, Man and Cybernetics, Oct. 7-10, 2007.
Hirsch, "Bibi Screen: A Thin, Depth-Sensing LCD for 3D Interaction Using Light Fields", Proceedings of the International Conference on Computer Graphics and Interactive Techniques, Dec. 16-19, 2009.
Cohen, "Interactive Fluid-Particle Simulation Using Translating Eulerian Grids", Proceedings of the Acm Siggraph Symposium on Interactive 3D Graphics and Games, Feb. 19-21, 2010.
Davison, "Mobile Robot Localisation Using Active Vision", Proceedings of the 5th European Conference on Computer Vision, Jun. 2-6, 1998.
De La Escalera, "Automatic Chessboard Detection for Intrinsic and Extrinsic Camera Parameter Calibration", Sensors Journal, Mar. 15, 2010.
Frahm, "Building Rome on a Cloudless Day", Proceedings of the 11th European Conference on Computer Vision, Sep. 5-11, 2010.
Fujii, "Three-Dimensional Finger Tracking Using Direct and Reflected Infrared Images", Proceedings of the 15th Annual ACM Symposium on User Interface Software and Technology, Oct. 27-30, 2002.
Furukawa, "Towards Internet-Scale Multi-View Stereo", Proceedings of the IEEE Computer Society Conference on Computer Vision and Pattern Recognition, Jun. 13-18, 2010.
Goesele, "Multi-View Stereo Revisited", Proceedings of the IEEE Computer Society Conference on Computer Vision and Pattern Recognition, Jun. 17-22, 2006.
Henry, "RGB-D Mapping: Using Depth Cameras for Dense 3D Modeling of Indoor Environments", In the Advanced Reasoning with Depth Cameras Workshop, Jun. 27, 2010.
Herath, "Simultaneous Localisation and Mapping: A Stereo Vision Based Approach", Proceedings of the IEEE/RSJ International Conference on Intelligent Robots and Systems, Oct. 9-15, 2005.
Cheung, "Robust Background Subtraction With Foreground Validation for Urban Traffic Video", Eurasip Journal on Applied Signal Processing, Jan. 1, 2005.
Carmody, "How Motion Detection Works in Xbox Kinect", Wired, Nov. 3, 2010.
Campbell, "Automatic 3D Object Segmentation in Multiple Views Using Volumetric Graph-Cuts", Image and Vision Computing, Jan. 2010.
Broll, "Toward Next-Gen Mobile AR Games", IEEE Computer Graphics and Applications, Jul. 2008.
Botterill, "Bag-of-Words-Driven Single Camera SLAM", Pre-Peer Reviewed Version of Article with the Same Title, Aug. 10, 2010.
Bolitho, "The Reconstruction of Large Three-Dimensional Meshes", Johns Hopkins University, PhD Dissertation, Mar. 2010.
Bolitho, "Parallel Poisson Surface Reconstruction", Lecture Notes in Computer Science, Nov. 2010.
Boehnke, "Fast Object Localization With Real Time 3D Laser Range Sensor Simulation", WSEAS Transactions on Electronics, Mar. 2008.
Besl, "A Method for Registration of 3-D Shapes", IEEE Transactions on Pattern Analysis and Machine Intelligence, Feb. 1992.
Benko, "DepthTouch: Using Depth-Sensing Camera to Enable Freehand Interactions on and Above the Interactive Surface", IEEE Tabletops and Interactive Surfaces, Oct. 1-3, 2008.
Baltzakis, "Tracking of Human Hands and Faces Through Probabilistic Fusion of Multiple Visual Cues", Proceedings of the IEEE International Conference on Computer Vision Systems, May 2008.
Curless, "A Volumetric Method for Building Complex Models from Range Images", Proceedings of the Acm Siggraph Conference on Computer Graphics and Interactive Techniques, Aug. 1996.
Katz, "Depth Camera Based on Structured Light and Stereo Vision", U.S. Appl. No. 12/877,595, filed Sep. 8, 2010.
Criminisi, "Foreground and Background Image Segmentation", U.S. Appl. No. 12/790,026, filed May 28, 2010.

(56) References Cited

OTHER PUBLICATIONS

Hsu, "Camera Based Motion Sensing System", U.S. Appl. No. 12/367, 665, filed Feb. 9, 2009.
Amit, "Shape Quantization and Recognition With Randomized Trees", Neural Computation, Aug. 1996.
Calonder, BRIEF: Binary Robust Independent Elementary Features, Proceedings of the 11th European Conference on Computer Vision, Sep. 5-11, 2010.
Chum, "Locally Optimized RANSAC", Pattern Recognition, 25th DAGMN Symposium, Sep. 10-12, 2003.
Comaniciu, "Mean Shift: A Robust Approach Toward Feature Space Analysis", Proceedings of the IEEE Transactions on Pattern Analysis and Machine Intelligence, Dec. 2002.
Dong, "Keyframe-Based Real-Time Camera Tracking", Proceedings of the 12th International Conference on Computer Vision, Sep. 27-Oct. 4, 2009.
Eade, "Unified Loop Closing and Recovery for Real Time Monocular Slam", Proceedings of the 19th British Machine Vision Conference, Sep. 1-4, 2008.
Hoiem, "3D LayoutCRF for Multi-View Object Class Recognition and Segmentation", Proceedings of the IEEE Computer Society Conference on Computer Vision and Pattern Recognition, Jun. 18-23, 2007.
Irschara, "From Structure-from-Motion Point Clouds to Fast Location Recognition", Proceedings of the IEEE Computer Society Conference on Computer Vision and Pattern Recognition, Jun. 20-25, 2009.
Klein, "Improving the Agility of Keyframe-Based Slam", Proceedings of the 10th European Conference on Computer Vision, Oct. 12-18, 2008.
Lepetit, "Keypoint Recognition Using Randomized Trees", Proceedings of the IEEE Transactions on Pattern Analysis and Machine Intelligence, Sep. 2006.
Li, "Location Recognition Using Prioritized Feature Matching", Proceedings of the 11th European Conference on Computer Vision, Sep. 5-11, 2010.
Montillo, "Age Regression from Faces Using Random Forests", Proceedings of the 16th International Conference on Image Processing, Nov. 7-10, 2009.
Ni, "Epitomic Location Recognition", Proceedings of the IEEE Transactions on Pattern Analysis and Machine Intelligence, Dec. 2009.
Nister, "Preemptive Ransac for Live-Structure and Motion Estimation", Proceedings of the 9th International Conference on Computer Vision, Oct. 13-16, 2003.
Rosten, "Faster and Better: A Machine Learning Approach to Corner Detection", Proceedings of the IEEE Transactions on Pattern Analysis and Machine Intelligence, Jan. 2010.
Schindler, "City-Scale Location Recognition", Proceedings of the IEEE Computer Society Conference on Computer Vision and Pattern Recognition, Jun. 18-23, 2007.
Se, "Vision-Based Global Localization and Mapping for Mobile Robots", Proceedings of the IEEE Transactions on Robotics, Jun. 2005.
Shotton, "Scene Coordinate Regression Forests for Camera Relocalization in RGB-D Images", Proceedings of the IEEE Computer Society Conference on Computer Vision and Pattern Recognition, Jun. 23-28, 2013.
Winder, "Learning Local Image Descriptors", Proceedings of the IEEE Computer Society Conference on Computer Vision and Pattern Recognition, Jun. 18-23, 2007.
Winn, "The Layout Consistent Random Field for Recognizing and Segmenting Partially Occluded Objects", Proceedings of the IEEE Computer Society Conference on Computer Vision and Pattern Recognition, Jun. 17-22, 2006.
Wu, "3D Model Matching With Viewpoint-Invariant Patches (VIP)", Proceedings of the IEEE Computer Society Conference on Computer Vision and Pattern Recognition, Jun. 24-26, 2008.

Bosch, "Image Classification Using Random Forests and Ferns", Proceedings of the IEEE International Conference on Computer Vision, Oct. 14-20, 2007.
Criminisi, "Decision Forests With Long-Range Spatial Context for Organ Localization in CT Volumes", Proceedings of the Workshop on Probabilistic Models for Medical Image Analysis, Sep. 20, 2009.
Crow, "Summed-Area Tables for Texture Mapping", Proceedings of the 11th International Conference on Computer Graphics and Interactive Techniques, Jul. 1984.
Dalal, "Histograms of Oriented Gradients for Human Detection", Proceedings of the IEEE Computer Society Conference on Computer Vision and Pattern Recognition, Jun. 20-25, 2005.
Dolejsi, "Reducing False Positive Responses in Lung Nodule Detector System by Asymmetric Adaboost", Proceedings of the IEEE International Symposium on Biomedical Imaging from Nano to Macro, May 14-17, 2008.
Fenchel, "Automatic Labeling of Anatomical Structures in MR FastView Images Using a Statistical Atlas", Proceedings of the 11th International Conference on Medical Image Computing and Computer-Assisted Intervention, Sep. 6-10, 2008.
Freiman, "Classification of Suspected Liver Metastases Using fMRI Images: A Machine Learning Approach", Proceedings of the 11th International Conference on Medical Image Computing and Computer-Assisted Intervention, Sep. 6-10, 2008.
Han, "Atlas-Based Auto-Segmentation of Head and Neck CT Images", Proceedings of the 11th International Conference on Medical Image Computing and Computer-Assisted Intervention, Sep. 6-10, 2008.
Homann, "Vasculature Segmentation of CT Liver Images Using Graph Cuts and Graph-Based Analysis", Proceedings of the IEEE International Symposium on Biomedical Imaging from Nano to Macro, May 14-17, 2008.
Jakobovits, "WIRM: An Open Source Toolkit for Building Biomedical Web Applications", Journal of American Medical Information Association, Dec. 2002.
Kalra, "Topological Modeling of Human Anatomy Using Medical Data", Proceedings of the IEEE Computer Society Conference on Computer Animation, 1995.
Kurkure, "Automated Segmentation of Thoracic Aorta in Non-Contrast CT Images", Proceedings of the IEEE International Symposium on Biomedical Imaging from Nano to Macro, May May 14-17, 2008.
Linguraru, "Multi-Organ Automatic Segmentation in 4D Contrast-Enhanced Abdominal CT", Proceedings of the IEEE International Symposium on Biomedical Imaging from Nano to Macro, May May 14-17, 2008.
Morra, "Automatic Subcortical Segmentation Using a Contextual Model", Proceedings of the IEEE Miccai Workshop on Computational Anatomy and Physiology of the Hippocampus, Sep. 6, 2008.
Pescia, "Automatic Detection of Liver Tumors", Proceedings of the IEEE International Symposium on Biomedical Imaging from Nano to Macro, May 14-17, 2008.
Pohl, "A Hierarchical Algorithm for MR Brain Image Parcellation", IEEE Transactions on Medical Imaging, Sep. 2007.
Prasad, "Multi-Level Classification of Emphysema in HRCT Lung Images Using Delegated Classifiers", Proceedings of the 11th International Conference on Medical Image Computing and Computer-Assisted Intervention, Sep. 6-10, 2008.
Quinlan, "C4.5: Programs for Machine Learning", Book Review by Steven Salzberg, Oct. 15, 1992.
Rubin, Data Explosion: "The Challenge of Multidetector-Row CT", European Journal of Radiology, Oct. 2000.
Rubin, "Medical Imaging on the Semantic Web: Annotation and Image Markup", AAAI Workshop on Semantic Scientific Knowledge Integration, Mar. 26-28, 2008.
Sharp, "Implementing Decision Trees and Forests on a GPU", Proceedings of the European Conference on Computer Vision, Oct. 2008.
Shimizu, "Multi-Organ Segmentation in Three-Dimensional Abdominal CT Images", International Journal of Computer Assisted Radiology and Surgery, Aug. 2006.
Shotton, "Semantic Texton Forest for Image Categorization and Segmentation", Proceedings of the IEEE Computer Society Conference on Computer Vision and Pattern Recognition, Jun. 23-28, 2008.

(56) References Cited

OTHER PUBLICATIONS

Shotton, "TextonBoost for Image Understanding: Multi-Class Object Recognition and Segmentation by Jointly Modeling Texture, Layout, and Context", Proceedings of the IEEE Computer Society Conference on Computer Vision and Pattern Recognition, Jun. 23-28, 2008.
Torralba, "Sharing Visual Features for Multiclass and Multiview Object Detection", IEEE Transactions on Pattern Analysis and Machine Intelligence, May 2007.
Tu, "Brain Anatomical Structure Segmentation by Hybrid Discriminative/Generative Models", IEEE Transactions on Medical Imaging, Apr. 2008.
Van Ginneken, "Robust Segmentation and Anatomical Labeling of the Airway Tree from Thoracic CT Scans", Proceedings of the 11th International Conference on Medical Image Computing and Computer-Assisted Intervention, Sep. 6-10, 2008.
Vibha, "Classification of Mammograms Using Decision Trees", Proceedings of the 10th International IEEE Computer Society Database Engineering and Applications Symposium, Dec. 14, 2006.
Viola, "Detecting Pedestrians Using Patterns of Motion and Appearance", Proceedings of the 9th IEEE International Conference on Computer Vision, Aug. 2003.
Viola, "Robust Real-Time Face Detection", International Journal of Computer Vision, May 2004.
Wels, "A Discriminative Model-Constrained Graph Cuts Approach to Fully Automated Pediatric Brain Tumor Segmentation in 3-D MRI", Proceedings of the 11th International Conference on Medical Image Computing and Computer-Assisted Intervention, Sep. 6-10, 2008.
Yao, "Simultaneous Location Detection of Multi-Organ by Atlas-Guided Eigen-Orgn Method in Volumetric Medical Images" International Journal of Computer Assisted Radiology and Surgery, 2006.
Yi, "Discriminative, Semantic Segmentation of Brain Tissue in MR Images", Proceedings of the 12th International Conference on Medical Image Computing and Computer-Assisted Intervention, Sep. 24, 2009.
Yin, "Tree-Based Classifiers for Bilayer Video Segmentation", Proceedings of the IEEE Computer Society Conference on Computer Vision and Pattern Recognition, Jun. 18-23, 2007.
Zambal, "Entropy-Optimized Texture Models", Proceedings of the 11th International Conference on Medical Image Computing and Computer-Assisted Intervention, Sep. 6-10, 2008.
Zhan, "Active Scheduling of Organ Detection and Segmentation in Whole-Body Medical Images", Proceedings of the 11th International Conference on Medical Image Computing and Computer-Assisted Intervention, Sep. 6-10, 2008.
Zhuang, "An Atlas-Based Segmentation Propagation Framework Using Locally Affine Registration - Application to Automatic Whole Heart Segmentation", Proceedings of the 11th International Conference on Medical Image Computing and Computer-Assisted Intervention, Sep. 6-10, 2008.
Breiman, "Classification and Regression Trees", 1984.
Ding, "Extraction of Human Body Skeleton Based on Silhouette Images", Proceedings of the 2nd International Workshop on Education, Technology and Computer Science, Mar. 2010.
Gall, "Class-Specific Hough Forests for Object Detection", Proceedings of the International Conference on Computer Vision and Pattern Recognition, Jun. 20-25, 2009.
Huang, "Estimating Human Pose from Occluded Images", Proceedings of the Asian Conference on Computer Vision, Sep. 2009.
Lee, "Body Part Detection for Human Pose Estimation and Tracking", Proceedings of the IEEE Workshop on Motion and Video Computing, Feb. 2007.
Leibe, "Robust Object Detection With Interleaved Categorization and Segmentation", International Journal of Computer Vision, Special Issue on Learning for Recognition and Recognition for Learning, May 2008.
Mori, "Guiding Model Search Using Segmentation", Proceedings of the IEEE 10th International Conference on Computer Vision, Oct. 17-21, 2005.
Poppe, "Body-Part Templates for Recovery of 2D Human Poses Under Occlusion", Proceedings of the International Conference on Articulated Motion and Deformable Objects, Jul. 9-11, 2008.
Vitter, "Random Sampling With a Reservoir", ACM Transactions on Mathematical Software, Mar. 1985.
Ziegler, "Tracking of the Articulated Upper Body on Multi-view Stereo Image Sequences", Proceedings of the IEEE Computer Society Conference on Computer Vision and Pattern Recognition, Jun. 17-22, 2006.
Sminchisescu, "Human Pose Estimation from Silhouettes a Consistent Approach using Distance Level Sets", Proceedings of the Wscg International Conference on Computer Graphics, Visualization and Computer Vision, Feb. 4-8, 2002.
Taylor, "The Vitruvian Manifold: Inferring Dense Correspondences for One-Shot Human Pose Estimation", Proceedings of the IEEE Computer Society Conference on Computer Vision and Pattern Recognition, Jun. 20-25, 2011.
Agarwal, "3D Human Pose from Silhouettes by Relevance Vector Regression", Proceedings of the IEEE Computer Society Conference on Computer Vision and Pattern Recognition, Jun. 27-Jul. 2, 2004.
Elgammal, "Inferring 3D Body Pose from Silhouettes Using Activity Manifold Learning", Proceedings of the IEEE Computer Society Conference on Computer Vision and Pattern Recognition, Jun. 27-Jul. 2, 2004.
Ballan, "Marker-Less Motion Capture of Skinned Models in a Four Camera Set-Up Using Optical Flow and Silhouettes", Proceedings of the 4th International Symposium on 3D Data Processing, Visualization and Transmission, Jun. 18-20, 2008.
Lu, "Multi-View Human Motion Capture With an Improved Deformation Skin Model", Proceedings of the Conference on Digital Image Computing: Techniques and Applications, Dec. 1-3, 2008.
Magnenat-Thalmann, "Joint-Dependent Local Deformations for Hand Animation and Object Grasping", Proceedings on Graphics Interface, Jun. 6-10, 1988.
Kurihara, "Modeling Deformable Human Hands from Medical Images", Proceedings of the Eurographics/ACM SIGGRAPH Symposium on Computer Animation, Aug. 27-29, 2004.
Black, "On the Unification of Line Processes, Outlier Rejection, and Robust Statistics with Applications in Early Vision", International Journal of Computer Vision, Jul. 1996.
Bregler, "Twist Based Acquisition and Tracking of Animal and Human Kinematics", International Journal of Computer Vision, Feb. 2004.
Breiman, "Random Forests—Random Features", Sep. 1999.
Corazza, "Markerless Motion Capture Through Visual Hull, Articulated ICP and Subject Specific Model Generation", International Journal of Computer Vision, Mar. 2010.
Da Vinci, "The Vitruvian Man", c. 1487.
Deutscher, "Articulated Body Motion Capture by Stochastic Search", International Journal of Computer Vision, Feb. 2005.
Gall, "Optimization and Filtering for Human Motion Capture: A Multi-Layer Framework", International Journal of Computer Vision, Mar. 2010.
Ganapathi, "Real Time Motion Capture Using a Single Time-of-Flight Camera", Proceedings of the IEEE Computer Society Conference on Computer Vision and Pattern Recognition, Jun. 13-18, 2010.
Kabsch, "A Solution for the Best Rotation to Relate Two Sets of Vectors", Acta Crystallographica, Sep. 1976.
Lepetit, "Randomized Trees for Real-Time Keypoint Recognition", Proceedings of the IEEE Computer Society Conference on Computer Vision and Pattern Recognition, Jun. 20-25, 2005.
Pilet, "Real-Time Non-Rigid Surface Detection", Proceedings of the IEEE Computer Society Conference on Computer Vision and Pattern Recognition, Jun. 20-25, 2005.
Salzmann, "Combining Discriminative and Generative Methods for 3D Deformable Surface and Articulated Pose Reconstruction", Proceedings of the IEEE Computer Society Conference on Computer Vision and Pattern Recognition, Jun. 13-18, 2010.
Urtasun, "Local Probabilistic Regression for Activity-Independent Human Pose Inference", Proceedings of the IEEE Computer Society Conference on Computer Vision and Pattern Recognition, Jun. 23-28, 2008.

(56) References Cited

OTHER PUBLICATIONS

Newcombe, "Real-Time Camera Tracking Using Depth Maps", U.S. Appl. No. 13/775,165, filed Feb. 23, 2013.
Borenstein, "Class-Specific, Top-Down Segmentation", Proceedings of the 7th European Conference on Computer Vision, May 28-31, 2002.
Borenstein, "Combining Top-Down and Bottom-Up Segmentation", Proceedings of the IEEE Computer Society Conference on Computer Vision and Pattern Recognition, Jun. 27-Jul. 2, 2004.
Borenstein, "Shape Guided Object Segmentation", Proceedings of the IEEE Computer Society Conference on Computer Vision and Pattern Recognition, Jun. 17-22, 2006.
Boykov, "Fast Approximate Energy Minimization Via Graph Cuts", IEEE Transactions on Pattern Analysis and Machine Intelligence, Nov. 2001.
Crandall, "Spatial Priors for Part-Based Recognition Using Statistical Models", Proceedings of the IEEE Computer Society Conference on Computer Vision and Pattern Recognition, Jun. 20-25, 2005.
Efros, "Image Quilting for Texture Synthesis and Transfer", Proceedings of the ACM SIGGRAPH/ Europgraphics Workshop on Graphics Hardware, Aug. 12-17, 2001.
Fergus, "Object Class Recognition by Unsupervised Scale-Invariant Learning", Proceedings of the IEEE Computer Society Conference on Computer Vision and Pattern Recognition, Jun. 18-20, 2003.
Fitzgibbon, "Image-Based Rendering Using Image-Based Priors", International Journal of Computer Vision, Feb. 2005.
Freeman, "Learning Low-Level Vision", International Journal of Computer Vision, Oct. 2000.
Jojic, "Epitomic Analysis of Appearance and Shape", Proceedings of the 9th International Conference on Computer Vision, Oct. 13-16, 2003.
Kannan, "Clustering Appearance and Shape by Learning Jigsaws", in Advances in Neural Information Processing Systems, Sep. 7, 2007.
Leibe, "Interleaved Object Categorization and Segmentation", British Machine Vision Conference, Sep. 2003.
Roth, "Fields of Experts: A Framework for Learning Image Priors", Proceedings of the IEEE Computer Society Conference on Computer Vision and Pattern Recognition, Jun. 20-25, 2005.
Rother, "Digital Tapestry", Proceedings of the IEEE Computer Society Conference on Computer Vision and Pattern Recognition, Jun. 20-25, 2005.
Turk, "Eigenfaces and Beyond", In Face Processing: Advanced Modeling and Methods, Academic Press, Dec. 28, 2005.
Berendsen, "Tracking and 3D Body Model Fitting Using Multiple Cameras", Jul. 31, 2008.
Criminisi, "Region Filling and Object Removal by Exemplar-Based Image Inpainting", IEEE Transactions on Image Processing, Sep. 2004.
Elhabian, "Moving Object Detection in Spatial Domain Using Background Removal Techniques - State-of-Art", Sep. 15, 2007.
Jia, "Finding Image Exemplars Using Fast Sparse Affinity Propagation", Proceedings of the International Multimedia Conference, Oct. 26-31, 2008.
Lefebvre, "Appearance-Space Texture Synthesis", Proceedings of the ACM SIGGRAPH International Conference on Computer Graphics and Interactive Techniques, Jul. 30-Aug. 3, 2006.
Toyama, "Probabilistic Tracking in a Metric Space", Proceedings of the 8th International Conference on Computer Vision, Jul. 2001.
CN Notice on the First Office Action for Application No. 201110118235.7, Dec. 4, 2012.
Hadwiger, "GPU-Based vol. Ray-Casting With Advanced Illumination", Proceedings of the ACM SIGGRAPH Asia Courses, Dec. 10-13, 2008.
Haqiqat, "Using Image Moments for Tracking Rotating Objects", Proceedings of the ICGST International Conference on Automation, Robotics and Autonomous Systems, Dec. 19-21, 2005.
Krainin, "Manipulator and Object Tracking for in Hand Model Acquisition", Proceedings of the IEEE International Conference on Robotics and Automation, Mobile Manipulation Workshop, May 3-8, 2010.
Lai, "Sparse Distance Learning for Object Recognition Combining RGB and Depth Information", Proceedings of the IEEE International Conference on Robotics and Automation, May 9-13, 2011.
Nguyen, "GPU Gems 3", Aug. 12, 2007.
Rusinkiewicz, "Efficient Variants of the ICP Algorithm", Proceedings of the 3rd International Conference on 3D Digital Imaging and Modeling, May 28-Jun. 1, 2001.
Shin, "Occlusion Removal Technique for Improved Recognition of Partially Occluded 3D Objects in Computational Integral Imaging", Optics Communications, Sep. 15, 2008.
Wikipedia, "Channel Access Method", Published online on or before Sep. 8, 2010.
Shivappa, "Person Tracking With Audio-Visual Cues Using the Iterative Decoding Framework", Proceedings of the 5th International Conference on Advanced Video and Signal Based Surveillance, Sep. 1-3, 2008.
Thayananthan, "Pose Estimation and Tracking Using Multivariate Regression", Oct. 8, 2007.
Laxton, "Monocular Human Pose Estimation", Uploaded Jul. 28, 2009.
Navaratnam, "Hierarchical Part-Based Human Body Pose Estimation", Uploaded Jul. 28, 2009.
Kanaujia, "Semi-Supervised Hierarchical Models for 3D Human Pose Reconstruction", Uploaded Jul. 28, 2009.
Zhong, "A Weighting Scheme for Content-Based Image Retrieval", 2007.
Agarwal, "Learning Methods for Recovering 3D Human Pose from Monocular Images", Inria, Oct. 2004.
Chrysanthakopoulos, "Augmenting Appearance-Based Localization and Navigation Using Belief Update", Proceedings of the 9th International Conference on Autonomous Agents and Multiagent Systems, May 10-14, 2010.
Remolina, "Towards a General Theory of Topological Maps", Artificial Intelligence, Apr. 1, 2002.
PCT International Search Report and Written Opinion for Application No. PCT/US2012/020681, Aug. 28, 2012.
PCT International Search Report and Written Opinion for Application No. PCT/US2012/020687, Aug. 30, 2012.
Fitzgibbon, "Robust Registration of 2D and 3D Point Sets", Proceedings of Image and Vision Computing, Dec. 1, 2003.
Knoop, "Sensor Fusion for 3D Human Body Tracking with an Articulated 3D Body Model", Proceedings of the IEEE International Conference on Robotics and Automation, May 15-19, 2006.
Sharp, "Camera Pose Estimation for 3D Reconstruction", U.S. Appl. No. 13/749,497, Filed Jan. 24, 2013.
Shotton, "Camera/Object Pose from Predicted Coordinates", U.S. Appl. No. 13/774,145, Filed Feb. 22, 2013.
Celik, "Monocular Vision Slam for Indoor Aerial Vehicles", in Proceedings of the IEEE/RSJ International Conference on Intelligent Robots and Systems, Oct. 11-15, 2009.
Debevec, "Acquiring the Reflectance Field of a Human Face", Available at: http://www.pauldebevec.com/Research/LS/, Published on or Before Apr. 4, 2004.
Debevec, "Acquiring the Reflectance Field of a Human Face", Proceedings of the 27th International Conference on Computer Graphics and Interactive Techniques, Jul. 23-28, 2000.
Einarsson, "Relighting Human Locomotion with Flowed Reflectance Fields", Available at: http://gl.ict.usc.edu/Research/RHL/, Published on or Before Oct. 4, 2006.
Einarsson, "Relighting Human Locomotion with Flowed Reflectance Fields", Proceedings of the 17th Eurpgraphics Symposium on Rendering, Jun. 26-28, 2006.
Gemeiner, "Improving Localization Robustness in Monocular Slam Using a High-Speed Camera", in Proceedings of Robotics: Science and Systems, Jun. 25-28, 2008.
Hilliges, "Using Photometric Stereo for 3D Environment Modeling Background", U.S. Appl. No. 13/729,324, Filed Dec. 28, 2012.
Mair, "Efficient Camera-Based Pose Estimation for Real-Time Applications", in Proceedings of the International Conference on Intelligent Robots and Systems, Oct. 10-15, 2009.
Beyer, "GPU-Based Multi-Volume Rendering of Complex Data in Neuroscience and Neurosurgery", Dissertation—Vienna University of Technology, Oct. 2009.

(56) References Cited

OTHER PUBLICATIONS

Borland, "Volumetric Depth Peeling for Medical Image Display", Jan. 16, 2006.
Bruckner, "Exploded Views for Volume Data", IEEE Transactions on Visualization and Computer Graphics, Sep. 2006.
Bullitt, "Volume Rendering of Segmented Tubular Objects", Proceedings of the International Conference on Medical Image Computing and Computer-Assisted Intervention, Oct. 14-17, 2001.
Preim, "Visualization in Medicine", Chapter 8, Jul. 5, 2007.
Criminisi, "Automatic Semantic Parsing of CT Scans Via Multiple Randomized Decision Trees", Abstract and Powerpoint, Radiological Society of North America, Dec. 2009.
Criminisi, "GeoS: Geodesic Image Segmentation", Proceedings of the European Conference on Computer Vision, Oct. 12-18, 2008.
Del Rio, "Intuitive Volume Classification in Medical Augmented Reality", Sep. 20, 2006.
Engel, "A Framework for Interactive Hardware Accelerated Remote 3D-Visualization", Proceedings of the EG/IEEE TCVG Symposium on Visualization, May 2000.
Engel, "Combining Local and Remote Visualization Techniques for Interactive Volume Rendering in Medical Applications", Proceedings of the IEEE Computer Society Conference on Visualization, Oct. 08-13, 2000.
Engel, "High-Quality Pre-Integrated Volume Rendering Using Hardware-Accelerated Pixel Shading", Proceedings of the International Workshop on Graphics Hardware, Aug. 12-13, 2001.
Engel, "Real-Time Volume Graphics", Proceedings of the ACM Conference on Computer Graphics and Interactive Techniques, Jun. 15-18, 2004.
Fovia, "www.fovia.com", Retrieved on Jan. 15, 2010.
Guthe, "Interactive Rendering of Large Volume Data Sets", Proceedings of the IEEE Computer Society Conference on Visualization, Oct. 27-Nov. 1, 2002.
Hardenbergh, "Integrated 3D Visualization of fMRI and DTI Tractography", Proceedings of the IEEE Computer Society Conference on Visualization, Oct. 2005.
Hastreiter, "Interactive Direct Volume Rendering of the Inner Ear for the Planning of Neurosurgery", Mar. 4, 1999.
Humpherys, "Chromium: A Stream-Processing Framework for Interactive Rendering on Clusters", ACM Transactions on Graphics, Jul. 2002.
Kainz, "Ray Casting of Multiple Volumetric Datasets with Polyhedral Boundaries on Manycore GPUs", ACM Transactions on Graphics, Dec. 2009.
Kniss, "Multi-Dimensional Transfer Functions for Interactive Volume Rendering", IEEE Transactions on Visualization and Computer Graphics, Jul. 2002.
Kruger, "Acceleration Techniques for GPU-Based Volume Rendering", Proceedings of the IEEE Computer Society Conference on Visualization, Oct. 19-24, 2003.
Lacroute, "Fast Volume Rendering Using a Shear-Warp Factorization of the Viewing Transformation", Proceedings of the ACM Conference on Computer Graphics and Interactive Techniques, Jul. 24-29, 1994.
Lacroute, Real-Time Volume Rendering on Shared Memory Multiprocessors Using the Shear-Warp Factorization, Proceedings of the ACM Parallel Rendering Symposium, Oct. 30-31, 1995.
Levoy, "Display of Surfaces from Volume Data", Jun. 1987.
Levoy, "Volume Rendering by Adaptive Refinement", Jun. 1988.
Li, "Empty Space Skipping and Occlusion Clipping for Texture-Based Volume Rendering", Proceedings of the IEEE Computer Society Conference on Visualization, Oct. 19-24, 2003.
Ljung, "Efficient Methods for Direct Volume Rendering of Large Data Sets", Dissertation—Linkoping University, 2006.
Lum, "Texture Hardware Assisted Rendering of Time-Varying Volume Data", Proceedings of the IEEE Computer Society Conference on Visualization, Oct. 24-26, 2001.
Ma, "A Data Distributed, Parallel Algorithm for Ray-Traced vol. Rendering", Proceedings of the ACM Parallel Rendering Symposium, Oct. 25-26, 1993.

Neumann, "Interactive vol. Rendering on a Multicomputer", Proceedings of the ACM Symposium on Interactive 3D Graphics, Mar. 1992.
Patidar, "Ray Casting Deformable Models on the GPU", Proceedings of the IEEE Computer Society Conference on Computer Vision, Graphics and Image Processing, Dec. 16-19, 2008.
Persson, "Volume Rendering of Three-Dimentional Drip Infusion CT Cholangiography in Patients With Suspected Obstructive Biliary Disease: A Retrospective Study", the British Journal of Radiology, Dec. 2005.
Rautek, "Semantic Layers for Illustrative Volume Rendering", IEEE Transactions on Visualization and Computer Graphics, Nov. 2007.
Rezk-Salama, "Interactive Volume Rendering on Standard PC Graphics Hardware Using Multi-Textures and MultiStage Rasterization", Proceedings of the ACM Conference on Graphics Hardware, Aug. 21-22, 2000.
Robler, "Dynamic Shader Generation for Flexible Multi-vol. Visualization", Proceedings of the IEEE Pacific Visualization Symposium, Mar. 5-7, 2008.
Robler, "GPU-Based Multi-VolumeRendering for the Visualization of Functional Brain Images", Proceedings of the 18th Conference on Simulation and Visualization, Mar. 8-9, 2006.
Sato, "Tissue Classification Based on 3D Local Intensity Structures for Volume Rendering", IEEE Transactions on Visualization and Computer Graphics, Apr. 2000.
Sharp, "Volume Rendering on Server CPUs for Enterprise-Scale Medical Applications", Eurographics/IEEE-VGTC Symposium on Visualization, Oct. 24-29, 2010.
Silva, "A Survey of GPU-Based Volume Rendering of Unstructured Grids", Revista de Informatica Teorica e Aplicada (RITA), Oct. 2005.
Singh, "Parallel Visualization Algorithms: Performance and Architectural Implications", Jul. 1994.
Smelyanskiy, "Mapping High-Fidelity VolumeRendering for Medical Imaging to CPU, GPU and Many-Core Architectures", IEEE Transactions on Visualization and Computer Graphics, Nov. 2009.
Strengert, "Large Volume Visualization of Compressed Time-Dependent Datasets on GPU Clusters", Mar. 1, 2006.
Yagel, "Volume Viewing Algorithms: Survey", International Spring School on Visualization, Retrieved Jan. 15, 2010.
Tam, "Volume Rendering of Abdominal Aortic Aneurysms", Proceedings of the IEEE Computer Society Conference on Visualization, Oct. 19-24, 1997.
Tatarchuk, "Advanced Interactive Medical Visualization on the GPU", Journal of Parallel Distributed Computing, Oct. 2008.
"The Visual MD", Retrieved on Jan. 15, 2010.
Tomandl, "Local and Remote Visualization Techniques for Interactive Direct Volume Rendering in Neuroradiology", Nov. 2001.
Totsuka, "Frequency Domain Volume Rendering", Proceedings of the ACM Conference on Computer Graphics and Interactive Techniques, Aug. 2-6, 1993.
Viola, "GPU-Based Frequency Domain Volume Rendering", Proceedings of the ACM Conference on Computer Graphics, Aug. 8-12, 2004.
Waage, "State of the Art Parallel Computing in Visualization Using CUDA and OpenCL", Proceedings of the Eurographics Association Seminar in Visualization, 2008.
Wald, "Faster Isosurface Ray Tracing Using Implicit KD-Trees", IEEE Transactions on Visualization and Computer Graphics, Sep. 2005.
Westermann, "Efficiently Using Graphics Hardware in Volume Rendering Applications", Proceedings of the ACM Conference on Computer Graphics and Interactive Techniques, Jul. 19-24, 1998.
"International Search Report & Written Opinion for PCT Patent Application No. PCT/US2013/077736", Mailed Date: Mar. 27, 2014, Filed Date: Dec. 26, 2013, 15 Pages.
Higo, et al., "A Hand-held Photometric Stereo Camera for 3-D Modeling", In International Conference on Computer Vision, Sep. 29, 2009, pp. 1234-1241.
Anderson, et al., "Augmenting Depth Camera Output Using Photometric Stereo", in Conference on Machine Vision Applications, Jun. 13, 2011, pp. 369-372.

(56) References Cited

OTHER PUBLICATIONS

Wagner et al., "Pose Tracking from Natural Features on Mobile Phones", Proceedings of the 7th IEEE/Acm International Symposium on Mixed and Augmented Reality, pp. 125-134, 2008.

Breiman, Leo, "Random Forests", Machine Learning, vol. 45 No. 1, pp. 5-32, Oct. 1, 2001.
Veas et al., "Creating Meaningful Environment Models for Augmented Reality", Proceedings of the IEEE Virtual Reality Conference, pp. 295-296, Mar. 8, 2008.
"International Search Report", Mailed May 12, 2014, Application No. PCT/US2014/016749, Filed Feb. 18, 2014.

CHANGE INVARIANT SCENE RECOGNITION BY AN AGENT

BACKGROUND

Automated agents can provide important services for humans. Examples of an automated agent can be a simple autonomous robot to provide services to an elderly person or to patrol a workplace at night. In addition, other automated agents can be a phone or vehicle that can provide navigation using captured images. A component of accomplishing navigation tasks is the ability to localize or estimate the current location of the agent and navigate reliably to reach locations in the environment.

The more affordable these agents are, the more likely such agents are to become commonly used. Some current robust techniques for agent localization and navigation employ high-precision laser sensors that provide reliable metric readings for surrounding objects. However, such high-end lasers are typically expensive, and can be too expensive to use in an agent where the cost of the agent is constrained.

Another less expensive alternative is to use cameras. While modern cameras provide excellent images for relatively low cost, using these images for localization and navigation is challenging because the images do not directly provide metric information about the environment. Instead, agents can avoid maintaining a metric map of the environment and operate directly in image space. A topological navigation can construct a graph of locations, where edges denote direct access between location nodes. Locations can be identified by sensor readings, typically pre-recorded images from a camera assigned to specific locations. An image representation can also be replaced by a condensed set of features extracted from the image to support rapid similarity computations. Then, the agent can navigate from image to image using a technique called visual homing. A well known problem that arises when using imperfect sensors is a perceptual aliasing problem, where multiple locations appear similar or even identical.

Furthermore, when a global positioning system (GPS) or any global localization scheme is not available, navigation has to be robust to illumination changes or any other changes in the scene, particularly with indoor navigation. Visible image sensors used for scene recognition can suffer from increased error when the scene illumination changes or an object in the scene moves, and an agent may not able to properly match scenes even with relatively minor changes.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various examples are described of a technology for change invariant scene recognition of an environment by an agent that uses image sensors to capture images. An example method can include the operation of grouping the images into situation image sets for locations and edges of a navigation graph to form an image database. A navigation image can be captured by the agent at the agent's current location. Another operation can be searching through images by separately loaded situation image set from the image database to identify images that are a probable match for the navigation image. Error values can be computed for matches between the navigation image and situation image sets. A probability can be calculated that situation image sets are to be used as a relevant situation image set based on the error values. A further operation can be searching the relevant situation image set for matching purposes with the navigation image while the error value is below a defined threshold.

DETAILED DESCRIPTION

Figure 1:
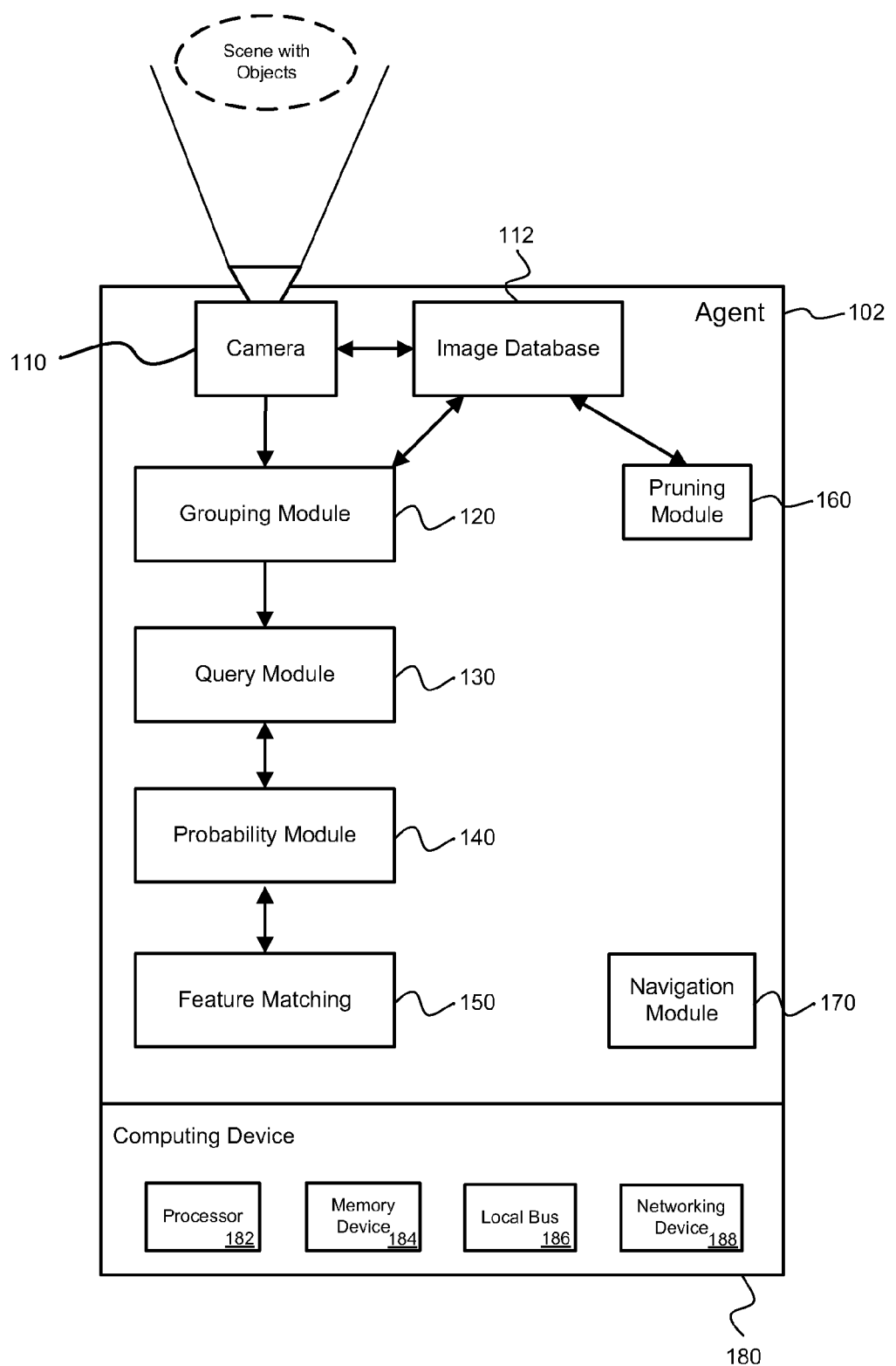
FIG. 1 is a block diagram illustrating an example of a system for change invariant scene recognition of an environment by an agent.

Reference will now be made to the exemplary examples illustrated in the drawings, and specific language will be used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

This technology can provide change invariant scene recognition for an agent. This change invariant approach can include image recognition technology to match navigational images with previously captured images for scenes by extracting high level signatures and features. Previously captured images can be grouped and stored together (e.g., "fused" together) and tagged based on a capture time and location or a capture event. So, images can be grouped together based on certain times or scene conditions, for example, images taken in a 30 second interval, images captured at different times of day, or images taken during various weather conditions.

As a navigation image is captured and compared against an image set that is temporally related, a probability can be computed that represents how likely future navigation images from the current location are to match with images in the image sets. The result is that the image set with a high probability (e.g., the highest probability) can be compared with the navigational image first. Comparing a navigational image against the image set with a high probably of matching can reduce the time taken to find a match and improve overall performance.

FIG. 1 illustrates a system for change invariant scene recognition of an environment by an agent 102. An agent may be a cell phone, a device with a web camera, a topological navigation device, or an autonomous robot. The system can include an image camera 110 using image sensors to capture images for the agent. The images may be grayscale depth images, colored visual images, or grayscale visual images.

A grouping module 120 can group the images into situation image sets. These situation image sets can be associated with locations and edges of a navigation graph. More specifically, images taken for a situation can be separated into different situation image sets, and this avoids storing every image in the same database without any particular organization. The "situational association" of the images means that the situational environment of a scene was similar when images in the set were captured. For example, an image set can be captured at a social occasion (e.g., a birthday party) or an image set may be captured with respect to objects in a location (e.g., artwork in a room). This means that a situational image set can be captured based on the way an agent is placed in relation to its surroundings or the agent's location. One useful situational association can be grouping images into sets from the same location. Another example of a situational image set can be an image set grouped based on a defined situation criteria, such as a collection of images of one physical location taken across many days during the same light and weather conditions. An image set can also be a temporal image set with images based on a time of capture at a specific location and this is a sub-category of the situational image sets. Images can also be grouped together based on just the time of capture. In another example, several images may be captured by an agent at one time as instructed by a user or a sequence of images can be captured when certain location oriented criteria are met (e.g. a specific piece of furniture is observed, such as a couch or piano).

An image database 112 can contain and store the situation image sets. The images may be stored in a database where each situation image set has a separate storage location. An example of a storage location can be a directory, folder, or another database or operating system sub-division where a group of temporally related images can be stored as a group. Alternatively, the images can be grouped and stored in a relational database or object-oriented database.

A query module 130 can query the image database by obtaining an image signature from a navigation image that is compared with image signatures for situation image sets. The details of obtaining image signatures will be discussed later. These situation image sets can be loaded individually by set (i.e., as separate sets) from the image database. The query module can still search through every image in the database if desired but each situation image set can load as a group.

As navigation images are acquired, the query module can first start matching against the same situation image set as long as a matching error is small. The matching error can be computed based how closely interest features match in the images being compared. The matching error can be an unscaled error value, and the error can be determined as being significant when the error exceeds a threshold value. When a situation image set has a small matching error as compared to a plurality of situation image sets that are being used, a probability can be calculated that this is the situation image set that can be used for most of the image comparisons until the error value increases, which indicates that the location of the agent has changed significantly. Narrowing down the searching based on situationally related images can avoid scanning every image in the database for every query or match process.

A probability module 140 can calculate a probability that a selected situation image set is to be used as a relevant situation image set. In one configuration, the most relevant situation image set can be identified. This means that a relevant situation image set can identified as the image set against which incoming navigation images can be compared because the relevant situation image set is likely to have an image that can currently match with the navigation image.

A feature matching module 150 can identify images in the relevant situation image set (e.g., the most relevant temporal set) that are similar to the navigation image and provide a navigation location for the agent. Global image signatures and local depth image features can be stored and can be used to robustly determine similarity of the navigation image to images in the situation image set to a level of accuracy that allows real-time navigation and localization. The details of obtaining features from the images will be discussed in more detail later.

Instead of storing a state for the agent that can represent the location of the agent, the state may be the situation image set that is active. A transition probability can be tracked that determines when a change may be made to search a different situation image set, and this transition probably can have a minimum or maximum threshold that allows the agent to change the image sets that are being searched in a variety of matching situations.

The agent can have a navigation module 170 to navigate from one navigation location to another navigation location. The navigation module can perform a number of tasks. First, the navigation module can determine the location of the agent within the environment in a probabilistic manner. In operation, the navigation module can generate a plurality of probabilistic beliefs ("beliefs") that identify the likelihood that the agent is associated with different locations identified in a directed graph. This means that at any given time, the navigation module can identify the location of the agent 102 using a probability density function, rather than specifying the physical coordinates (e.g., Cartesian coordinates) of the agent within the environment. Further, the navigation module can use probabilistic techniques to assess the location of the agent along a particular transition path.

In addition, the navigation module can allow the agent to navigate through the environment based on a probabilistic assessment of location. To this end, the navigation module may include a high-level (HL) control module and a low-level (LL) control module. The HL control module can identify a plurality of votes for different respective locations within the directed graph or navigation graph. The votes can make different respective recommendations for actions to be taken, based on the "perspective" of different locations in relation to a destination location being sought. The HL control module can modify the votes by the above-described probabilistic beliefs (and, in some cases, cost information) to provide weighted votes. The HL control module can then select an action based on considering the weighted votes. Example actions include "do nothing" (in which the agent 102 takes no action), rotate (in which the agent rotates in place at a particular location), navigate (in which the agent navigates along a transition path), and explore (in which the agent moves throughout the environment without regard to a destination location).

In performing the above-described tasks, the navigation module 108 may rely on a feature matching module 150. As discussed, the feature matching module can assess the similarity between a navigation image (i.e., an input image) and any image associated within the directed graph, referred to herein as a graph image. These assessments can be made as separate situation image sets are loaded. The feature matching module can perform this matching operation using any technique. For example, the feature matching module can identify features associated with the input navigation image and determine the extent to which these features match features associated with images in a situation image set in the graph. In one example, matching can be performed by first comparing one or more global signatures associated with the navigation image with global signatures associated with the situation image sets. This fast comparison produces a subset of previously stored situation image sets that are possible matches for the input image. The approach then performs matching on a higher granularity by comparing features within the navigation image and features within the subset of images in a situation image set. A number of image matching methods can also be used, such as a standard Harris-type feature comparison algorithm without the use of global signatures, etc.

A pruning module 160 can be provided to remove situation image sets that have not been utilized in navigation for a period of time due to a reduced amount of matching. There may be some situation image sets in the database that are not matching with navigation images and this may continue over a period of time. Such situation image sets can be removed from the database when a threshold defined for the period of time is reached. For example, if more than 30 or 60 days has passed since a match has been made with a situation image set, then the situation image set can be removed from the database. Alternatively, a situation image set can be removed from the database when a garbage collection operation or storage deallocation process is being performed, if the situation image set has not been matching with relatively recent navigation images.

The agent 102 can further include a computing device 180 with a hardware processor device 180, a hardware memory device 182, a local communication bus 184 to enable communication between hardware devices and components, and a networking device 186 for communication across a network with the compute nodes, processes on the compute nodes, or computing devices on other agents.

The use of images combined into groups or image sets that are situationally associated results in an image matching or searching approach that is generally illumination invariant and also responds robustly to dynamic changes in the environment. For example, dynamic changes in the environment can include changing objects (e.g., furniture, toys, etc.) or people in the scene. This technology can match situation image sets having images that are more relevant to a navigation image and so exact matches may not be needed. In addition, situation image sets with changes to the scene that do not match the current scene will be unlikely to be used. The use of group level image matching also applies to both indoor and outdoor scenes when topological or image based matching is being used (i.e., GPS is not available).

Figure 2:
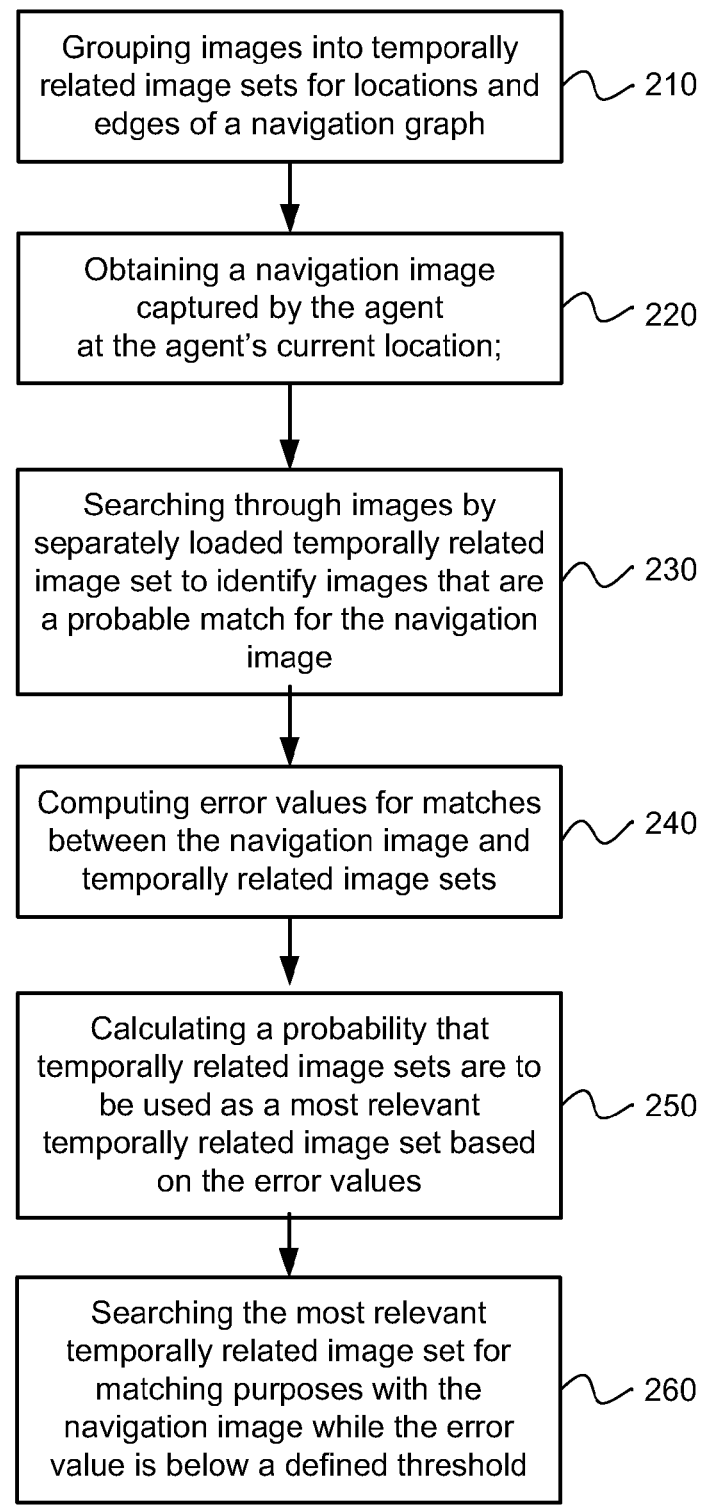
FIG. 2 is an example of a flowchart illustrating a method for change invariant scene recognition of an environment by an agent.

FIG. 2 illustrates an example of a method for change invariant scene recognition of an environment by an agent that uses image sensors to capture images. The agent can be an autonomous self-propelled robotic device, a cell phone, a web camera on a laptop, a vehicle, a mobile device, or a mobile game controller sensor. The image sensor(s) can capture images using color sensors, grayscale sensors, or a depth image sensing sensors and processing.

The method can include the operation of grouping the images into situation image sets that may be identified by tags for locations and edges of a navigation graph to form an image database, as in block 210. Each situation image set can include multiple discrete images taken during a certain period of time at a specific location, and there can be multiple captures that form multiple situation image sets from same room. For example, a situation image set can be created by a user initiating a situation image set capture. Specifically, a user may take a robot or a camera in a cell phone on a tour and designate certain places where a set of images are captured. The user may inform the robot or phone that a location is the kitchen and capture a set of situationally related images for that location to form a situation image set.

A navigation image can also captured by the agent at the agent's current location, as in block 220. The navigation image can be an image at a location the agent is current located. The images can then be searched through by separately loaded situation image sets from the image database to identify images that are a probable match for the navigation image, as in block 230. Because the images are separated into situation image sets, comparison of the navigation image with the situation image sets can take place the using the same vision processing scheme to compare across captures taken at different times with no special processing and no need to detect current illumination conditions. When the situation image set has been searched, a good image match, out of the most relevant capture set can be used.

A further operation can be computing error values for matches between the navigation image and situation image sets, as in block 240. The error values can be unscaled real numbers with no upper limit. Alternatively, the error values can be scaled with respect to a minimum or maximum expected error value.

A probability can be calculated that situation image sets are to be used as a most relevant situation image set based on the error values, as in block 250. In addition to calculating the probability that a situation image set is relevant (e.g., most relevant), a transition probability can also be computed. The transition probability can determine whether the navigation image match is initially searched for in the current situation image set or whether the agent will change which situation image set is initially searched for a match. As the transition probability increases, then the probability that a different situation image set will be searched first for the next navigation image is higher and more likely. For example, the transition probability can increase as the error for the match increases.

In one configuration, the agent can track a relevant situation image set for individual locations and edges of the navigation graph. For a location or edge, a situation image set reference or value may be stored that associates the relevant image set with the location or edge. This allows the searching for a match to the navigation image to be faster because a more likely image set for a match can be searched first, and if a desired match is not found then other situation image sets can be searched.

The relevant situation image set can also be searched for image matching purposes with the navigation image while the error value is below a defined threshold 260. While the error value is low, the incoming navigation images can be searched for in the relevant situation image set. The probabilistic model can help prioritize the expected relevant situation image set to compare with the navigation image. This can avoid the computation time that would otherwise be used to compare to navigation images with a large number of the images stored in the database when good matches are coming from the one situation image set.

In one configuration, the agent can check for situation image sets that have had consistently high errors in matching results over the defined period of time. Situation image sets that are consistently not matching with navigation images that are captured by the agent are image sets that may have an old view of a location or edge. If a number of objects have been rearranged in a scene or a specific lighting arrangement is not used anymore, then the situation image sets associated with these scenes can be discarded.

This technology can make image matching in an agent more efficient because initial decisions are made about the situation image sets that will be initially used for matching and processing. The matching process assumes that for every real location (e.g., bedroom A) there are one or more groups of images that are situation image sets. Based on the calculated error values, a good set of situationally related images can be selected for the matching against the navigation image using the computed probability, and most often the best set will be selected. This image group level decision can also avoid searching through every image in an image database which can make the technology more efficient. Searching through every image in the database can also increase the chance of false positives.

Robot Implementation

While a high level overview of technology has been discussed that can be used with various agents, such as cell phones, web cameras on laptops and autonomous agents, a more detailed example of using this technology in an autonomous robot can now be described.

A robot using appearance-based localization can compare a currently captured image or navigation image taken from a robot's camera to a set of pre-recorded images or a situation image set in order to estimate the current location of the robot. A graph of situation image sets can be maintained to model the dynamics of the image sequences. The graph can also be used to navigate in the space of images. This may allow a robot to be deployed in a relatively small environment, such as a house, or a work place, and enable the robot to robustly navigate the environment after minimal training.

When the robot is introduced into a new environment, a human may give the robot a partial 'tour' of the environment by visiting a set of locations and the human can provides labels by names. Throughout the tour the robot can collect images of the locations and the paths between locations, thus building a topological map. The map may be a two-layered map. The higher layer can be a graph where vertexes represent locations and edges represent paths. For the paths, a low level image sequence can be maintained that can later allow the path to be traced.

The robot can also group the images into situation image sets that may be identified by tags (e.g., kitchen, living room, etc.) for locations and edges of a navigation graph and store the situation image sets in a directory tree structure on an operating system. For example, a directory may be provided for the kitchen and subdirectories can exist for each situation image set.

A navigation image can also captured by the robot at the robot's location as the robot moves around. Separately loaded situation image sets from the image database can then be searched to identify images that are a probable match for the navigation image. When the situation image set has been searched, then the best image match from the most relevant capture set can be used. Error values can be computed for matches between the navigation image and a situation image set. A probability can be calculated that situation image sets are to be used as a most relevant situation image set based on the error values.

In one configuration, the robot can track a most relevant situation image set for individual locations and edges of the navigation graph. This allows the match searching for the navigation image to be faster because a more likely image set for a match can be searched first. The most relevant situation image set can also continue be searched for image matching purposes with the navigation image while the error value is below a defined threshold. The probabilistic model can prioritize the expected most relevant situation image set to compare with the navigation image. This can avoid the computation time that would otherwise be used to compare to navigation images with a large number the images stored in the database when good matches are coming from a single situation image set.

In another configuration, the robot can check for situation image sets that have had consistently high errors in matching results over a defined period of time. Situation image sets that are consistently not matching with navigation images that are captured by the robot are image sets that may have an old view of a location or edge, then these situation image sets can be discarded.

To provide a robust localization estimation, Partially Observable Markov Decision Process (POMDP) belief tracking can be used to measure and update the probability of each possible robot location, given the previous observations. A higher level belief probability can be maintained for the vertexes and edges of the graph, and a low level belief probability can be maintained for the current location within each edge. When the robot is given a command to navigate to a destination, the robot can compute the cost of navigation from each location. Then, decisions can be made based on the expected cost of actions, and the robot can navigate to a destination attempting to minimize the cost, whether the cost is time or energy consumption.

Localization and Navigation

When using a topological navigation approach, the robot can create a graph, where each node is composed of a set of sensor readings, and edges between two nodes denote direct reachability. Given the graph, the agent can navigate to a destination by traversing the graph, each time attempting to reproduce the sensor readings associated with the next node. Many topological navigation methods use images from cameras.

One possible method for moving between nodes associated with sensor readings is called visual homing. In this technique the robot tries to achieve the same sensor readings as pre-captured target readings. For example, in the case of images, a two-dimensional (2D) transformation can be computed between two images, specifically the current image captured by the robot camera and the target image. Given this transformation, an angular direction can be computed that may reduce the magnitude of the transformation, thus causing the current image to look more like the target image.

As working directly with high dimensional sensor readings (e.g., images) is computationally intensive, a common approach is to extract a set of features or interest points from the images. Then, the two images can be compared through the sets of features in the two images. This comparison can be invariant to scale, distance, rotation, and other transformations in the image. By constraining the number of features for each image, accuracy can be traded for speed.

Appearance-based localization can use images to represent locations and use image comparisons to detect whether the current captured image can be associated with a known location. Such methods may be augmented using some motion models and topological information to restrict the space of candidate locations.

Partially Observable Markov Decision Process

A robot navigating through an environment using imperfect sensors and motors can be modeled by a Partially Observable Markov Decision Process (POMDP). A goal-based POMDP can be a tuple <S, A, tr, C, G, $\Omega$, O, $b_0$> where:

S is a state space. Each state can encapsulate relevant information about the environment used to make a decision.

A is a set of actions. The agent can influence the environment by executing actions. Actions effects are stochastic, and tr(s, a, s') pr($s_{t+1}$=s'|$s_t$=s, $a_t$=a) is the probability of executing a in state s and transitioning to state s'.

C(s, a) is a cost function associating a cost with a state and an action.

G ⊆ S is a set of goal states, specifying the desirable destination of the navigation.

Ω is a set of observations, or possible sensor readings.

$O(s, o) = pr(o_t = o | s_t = s)$ is the probability of observing o in state s.

$b_0$ is a probability distribution over start states.

As in a POMDP, the real world state s is not directly observable, and a belief can be maintained that is a probability distribution over possible world states. Given a current belief b, an action a, and an observation o, the next belief b' can be computed by:

$$b's' = \frac{O(s', o) \sum_{s \in S} b(s) tr(s, a, s')}{\kappa} \quad (1)$$

where $\kappa = pr(o_{t+1} = o | b_t = b, a_t = a)$ is a normalization factor. The optimal policy of the POMDP can be represented as a mapping from beliefs to actions.

Robot Hierarchical Topological Model

As discussed before, a two-layered representation can be used to model an environment graph. On an upper layer, vertexes can denote locations in the environment, and edges can denote paths between locations. On the lower layer, each edge can be represented by a sequence of images. This hierarchical representation can provide both an abstract representation for making high level navigation decisions, and an explicit low level path representation that may be translated into motion commands.

In the upper layer topology, the known locations can be captured in the environment as nodes. Each node can be associated with a set of images that were taken in that location. Thus, the set of images becomes the identifying sensor readings for the location.

A POMDP model can be defined over the graph G=<U, E>. Each node and edge in the graph may be a state—S=V∪E. A set of high level navigation commands can be defined:

RotateAndFindEdge—turn around without moving forward, looking for a specific edge, given as a parameter to the action.

Navigate—navigate along an edge (path). This action is applicable for edges.

Explore—heuristically move towards the open spaces. This command can be used when the robot is unsure of its location, or when the robot is stuck and cannot move due to obstacles.

DoNothing—a no-op command, typically used when the robot has reached the robot's destination and awaits a new command.

Most of these commands move the robot stochastically between states. The transition probabilities can be defined through relations between states. For example, if s is a location, s' is an edge moving out of s, the robot executes the action a=RotateAndFindEdge with $s_g$ as the goal edge, then tr(s, a, s')=p>0, and tr(s, a, $s_g$)>tr(s, a, s). For any other state, location or edge, not going out of s, the transition probability is 0. The following relations between state may be supported: origin location of edge, target location of edge, edge going out of location, edge entering a location, edges with shared origin, edges with shared destination, reverse edge. The transition probabilities can be tuned to fit the domains, as learning the probabilities from experience may require many trials, and the robot is desired to be deployed rapidly in real environments.

Action costs can be modeled through execution time. Such costs can be computed directly from the sequences of captured images and the robot properties. For example, if time stamps are maintained for images, the cost of a navigate action can be defined based on the time difference between the first and last image. The time the robot takes to complete a full 360±rotation can also be computed.

The observation set Ω is the set of the possible images. The system typically cannot maintain or iterate over this set explicitly. An observation function can be defined using an image similarity engine sim(i,i'). The image similarity engine will be discussed in detail later. The POMDP method assumes that an engine is provided that, given two images, provides a similarity score. This engine can compute a similarity score for an image and a state:

$$sim(s,i) = \max_{i' \in s} sim(s,i') \quad (2)$$

maximizing over the images i' associated with a states whether the state is a location or a path. The max can be used as the aggregator rather than other options (e.g., the mean similarity of images), as images are taken from different angles in a location, or from different positions along a path. Therefore, it is reasonable that just one or two images from each state match the captured image.

When computing a belief update (Equation 1), a state-image similarity score can be used instead of an observation probability, thus making the assumption that sim(s, i) ∝ pr (i|s). The advantage of this approach is that $\kappa = pr(o|b,a)$ does not need to be computed, as the new belief state can be normalized after computing the new pseudo-belief in the numerator of Equation 1 using the similarity metric.

A lower layer edge representation can also be provided. For edges, a sequence of images can be captured when the edge is introduced. This sequence can be used both for localizing within an edge and for navigation along an edge. A local belief probability can be maintained over the images within an edge: b(i|s), which is the probability that the robot is currently at image i given that the robot is within state s.

To compute this local belief probability, a POMDP model can be used for each edge, where the states can be the images on that edge. The actions can be moving forward through the edge, or not (any other action). When the robot moves along the edge, the probability of remaining on each image or transitioning to future images is computed based on the distance (whether in metric space or in time) between images and the current velocity of the robot. For example, when the robot moves faster and the images are nearer, the transition probability to the next image in the sequence is relatively high. When the robot moves slower, such as when the robot is moving around corners, the transition probability may be reduced accordingly.

In addition, belief can be injected from other graph elements, such as other paths and locations. For example, when a RotateAndFindEdge action is executed in a location s, a transition into an intersecting edge s' may occur. In this case, the new belief mass that has transitioned from s into s':

$$b(s) tr(s,a,s') O(s',o) \quad (3)$$

This new belief mass can be injected into the edge appropriately. For example, when the edge is a path going out of a location, the new belief mass is injected uniformly into the first 5% of the image sequence. When the belief mass is from another edge, such as an edge with a shared origin, the new belief mass can be spread uniformly along the edge. To properly balance between the new belief mass and the existing belief mass on the edge, the local beliefs are first scaled to the overall belief using b(i|s)·b(s), then the new belief mass is injected from other locations. Afterwards, the inner edge transition probabilities are used to compute the next belief state.

When a robot is deployed in a new environment, the two-layered model for that environment can be acquired or learned (i.e., the important locations and the paths between them). It is valuable when the learning phase can have a minimal cost. For example, the robot can follow a human teacher through a tour of the environment. Along the tour, the human will specify important locations in the house. For example, the human may say along the tour, "this is the kitchen". The robot can then add a new location to the model, labeling it as "kitchen", and spin around, taking a set of images associated with the new location. When the robot follows the human, the robot can record the images along the path. When a new location is introduced, the robot sets the recorded path as an edge between the previous location and the new one.

Image Similarity Engine

An image similarity engine is designed to rapidly provide a ranked list of N images from the pre-recorded image dataset that best match a given image. For each image the engine computes a similarity score. While this discussion focuses on image similarity, the same methods can apply to other types of sensors, such as depth cameras. This example method uses a two pass process. On a first pass, images that are substantially different are filtered based on crude image signatures leaving a relatively small candidate set C. On the second pass, features that were extracted from the images in C can be compared to provide a matching score.

While high accuracy in relating new images to previously observed images is good, this approach does not find an exact match each time and can easily recover from identification errors. The belief update mechanism may take into consideration the noise in the sensor, whether that noise comes from image blur or from improper feature detection. In both cases, the belief update may be applied such that the noise will not bias the selection consistently towards the wrong images. As long as the similarity scores for the truly similar images is in general higher, the repeated belief update will not be significantly affected by the noisy observations.

In an example of feature detection, a Harris corner detector can be used to extract features from the image. This detector uses the gradient from each pixel to the pixel's neighbors to detect significant changes that typically correspond to corners in the image. The features may then be ranked by strength, and the top features can be maintained for each image. For each feature, a feature descriptor vector can be maintained. The resulting features can be relatively robust to scale, orientation, and illumination. Other types of feature detector can be used too. Examples of other detector methods include the MSER (Maximally Stable Extremal Regions), SIFT (Scale-Invariant Feature Transform), and FAST corner detectors.

In a first pass, local and global signatures can be identified. When an image is introduced into the database, an image signature can be computed based on global image properties, such as color histograms. These properties can be used to compute a property vector that will be used as the signature of the image. A list of possible signature components is below:

Color histogram: The image can be converted to YCbCr colorspace and a histogram of pixel intensity distributions can be created in each color channel. The histogram can provide an imagewide signature or a global description of the entire image.

Thumbnail: The image can be reduced to a smaller pixel image, across multiple color channels. This thumbnail can also be represented using a vector to provide another global description of the image.

Feature summary: As comparing the Harris features directly is relatively costly, a summary of the set of features can be generated, by computing the mean and variance of the feature descriptor vectors. As the Harris features are computed locally, this signature can signal that similar objects appear in the two images, but not whether the objects are located in the same place in the two images. This signature thus provides local information about objects in the image.

In a second pass through the images, the corner features can be computed. As explained before, Harris features can be extracted from each image. In the second pass, a bag of features approach can be used with a K-dimensional tree. The query image or the navigation image received from the robot's camera can be compared with each image in the situation image set. To compare two images the set of Harris features can be used. For each feature in the query image, the best matching feature in the candidate image can be found and their distance can be computed. This approach may select the same feature from the candidate image multiple times, but this can be appropriate for the Harris features that tend in many cases to be grouped around an informative corner. It may be less important in this case to distinguish between the different corner features.

The distances between each feature and its best match can then be summed, and used as an error estimation $e_{features}(i,i')$. Even though the comparison of corner features results in relatively accurate image matching, the information in the cruder signatures is also valuable. Therefore, the information from the other signatures can be combined together to form a final error estimation $e(i,i')$ by a weighted sum of the errors from the various components.

The error can then be converted into a normalized similarity measurement using:

$$sim(i, i') = 1 - \frac{e(i, i') - e_{min}}{e_{max} - e_{min}} \quad (4)$$

where $e_{max}=\max_i e(i,i')$ is the maximal error within the candidate set and $e_{min}=\min_i e(i, i')$ is the minimal error. While this computation is relatively intensive due to computing the best match for each feature among the features in each image in the candidate set, the computation is feasible because most images are filtered out in the first pass. The above method computes a similarity between the current image and a set of candidate images.

Localization is the task of inferring a current location of the robot within the environment. The probabilistic model allows the robot to be uncertain as to the robot's true location. In general, we consider localization as obtaining a probability distribution over locations and paths or the states of the model. A probability distribution can be obtained from the beliefs that are computed both over the high level and the low level models. The high level model provides an estimation of the probability of being in any location and path. The low level models provide estimations about our current location within edges, assuming that the robot is currently on that edge. Thus, the probability can be estimated that the robot is currently at any location, and also the probability of our location along an edge.

In many cases images from different parts of the environment can look very similar. For example, in an office environment, many corridors may look almost identical. However, as the belief update uses the previous belief and the transition probabilities to compute the new belief, observing occasionally images that are very similar to remote locations has a minimal effect. The probability mass can shift to a new state if the images from that state are consistently better matched with the current image. In that case, the evidence for a different location may be substantial enough to deduce that the previous location estimation was incorrect.

The same problem can arises when the robot navigates along an edge. It often happens that the most similar image along the edge is far from the true location of the robot, either forward or backward. Indeed, the best matched image can move forward or backward along the edge, not displaying a linear advancement. Again, the use of transition probabilities and belief updates do not allow erratic position estimates along the edge and provide a more robust estimator.

Figure 3:
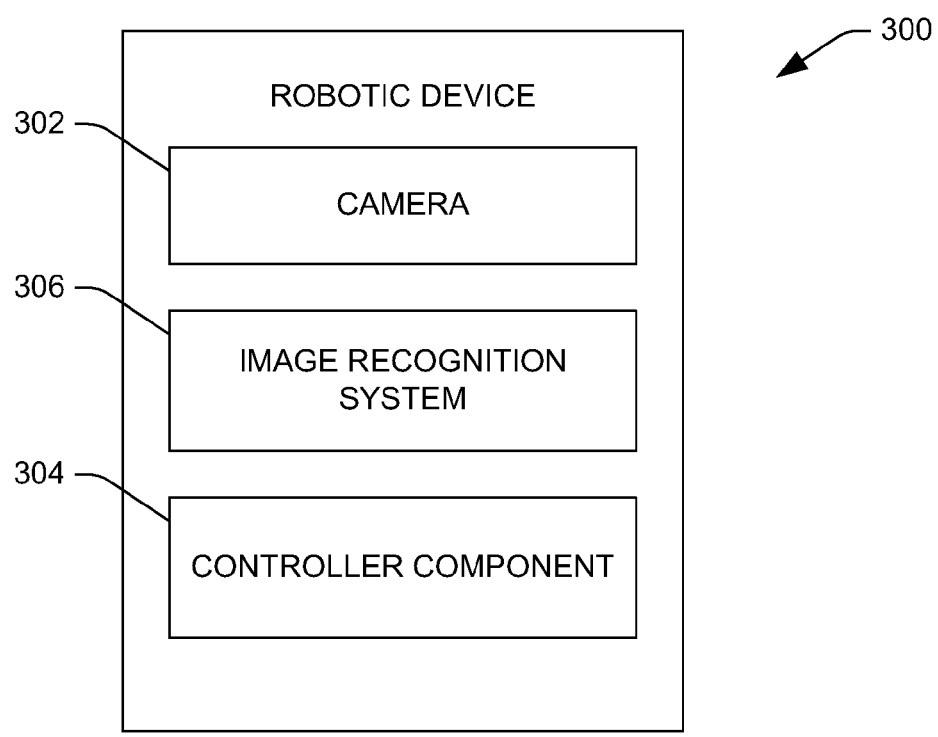
FIG. 3 is a block diagram illustrating components of a robot for change invariant scene recognition.

FIG. 3 illustrates an example robotic device 300 that uses an image matching system as described. The robotic device can include a digital camera 302. In an example, the digital camera may be configured to capture color, gray scale, and/or depth images of one megapixel or greater.

The robotic device 300 can also include the image recognition system 306 described above. The robotic device may also include a processor, buses and other hardware that can be used in connection with implementing the image recognition system. As an example, the robotic device may include a general purpose processor, a graphics processing unit or other suitable processor or integrated circuit. In another example, an image captured by the robotic device by the camera 302 can be provided to the image recognition system 306, which can determine which image in a situation image set most closely matches the image captured by the camera.

The robotic device 300 further includes a controller component 304 that causes the robotic device to act based at least in part upon the output of the image recognition system 306. For instance, the controller component can control motion of the robotic device 300, and thus may cause the robotic device to move in a particular direction based upon output of the image recognition system. For example, the controller component can use the output of the image recognition system to determine location of the robotic device and can cause the robotic device to move, based at least in part upon the determined location. Furthermore, the controller component can determine orientation of the robotic device based at least in part upon output of the image recognition system.

The robotic device 300 may be or include any suitable robotic device. For example, the robotic device may be or be included in an automated lawnmower or vacuum. In other examples, the robotic device may be included in more sophisticated devices such as in an airplane in connection with an autopilot function, in a rail system that can be used in connection with recognizing hazards along a railway or location of rail stops, in an automobile to inform an occupant thereof of particular landmarks in the field of view of a camera, etc. Other applications are also contemplated and intended to fall under the scope of the hereto appended claims. For example, the image recognition system may be used in any suitable application where image matching is desirable.

Light Invariance

Figure 4:
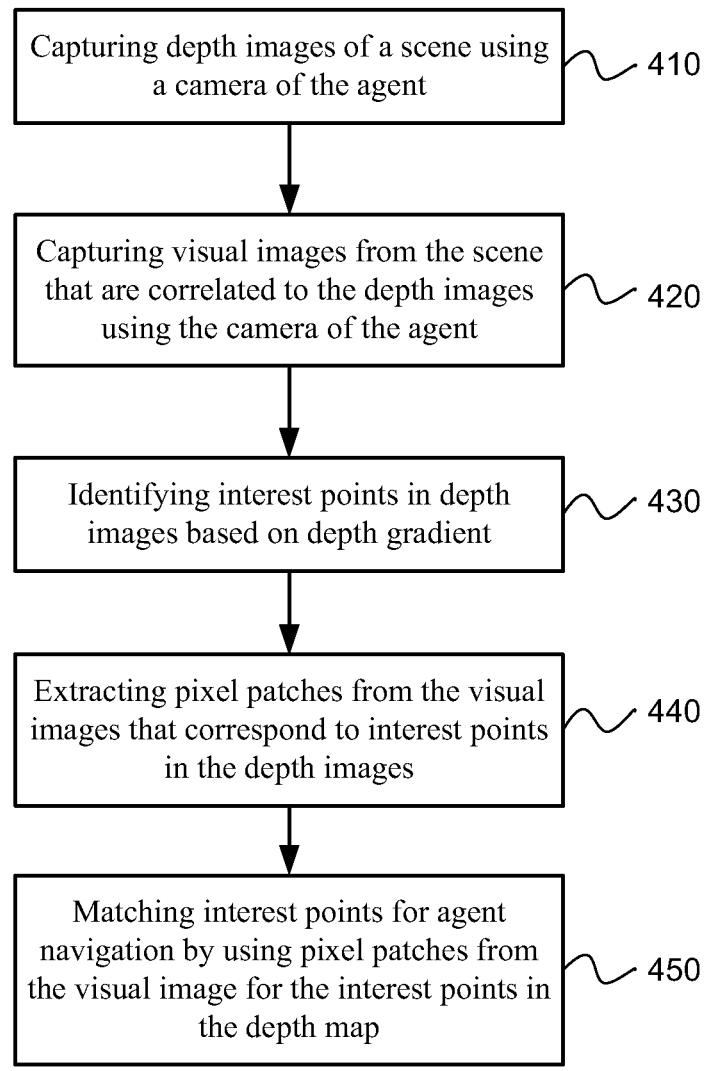
FIG. 4 is a flowchart diagram illustrating an example of light invariant scene recognition in an environment by an agent.

FIG. 4 illustrates a method for light invariant scene recognition in an environment by an agent. Depth images of a scene can be captured using a camera of the agent, as in block 410. The depth images can be captured by a depth camera system. As an example, a depth camera system can identify the scene volume with near-IR (infrared) light. Then a CMOS (Complementary Metal-Oxide-Semiconductor) image sensor can read the light back from the scene, and a computational method can decipher the received light and produce a depth image of the scene.

Visual images can also be captured from the scene, which are correlated to the depth images using the camera of the agent, as in block 420. The correlation between the visual images and the depth images can be that both images cover the same or overlapping areas of a scene. A visual camera of the agent (e.g., a color CMOS image sensor) can capture the color visual light spectrum. The visual camera can be separate from the depth camera, but in some cases the depth camera and visual camera can be integrated. This means that a depth image and a color image of the same scene may be captured.

The interest points in depth images based on depth gradient can also be identified, as in block 430. Interest points can be found using interest point detector methods, as described before, that include: FAST, Harris, and MSER methods that can scan through the image and look for gradient changes.

A depth image is not affected by light so the agent can analyze areas with high depth gradient to identify visual areas of interest. Pixel patches from depth images are low quality grayscale (e.g., coarse geometric). A global signature can also be extracted from depth images that are a histogram, centroid, or thumbnail of the original depth image.

After identifying interest points in the depth images, pixel patches can be extracted from the visual images that correspond to interest points in the depth images, as in block 440. This means that a plurality of interest points can be identified using the depth images, and then corresponding areas in the visual image that have the same coordinates as the area of interest in the depth image can have pixel patches extracted. For example, a depth match may be able to see a corner on couch or door molding but this same area may also have texture and color patterns that can be captured by the color image. Thus, the visual camera can capture the color patterns, texture patterns, or other visual data located at the same point as the interest points in the depth images. In an alternative configuration, the interest points from depth image can be used to identify pixel patches extracted from both the depth image and visual image.

The interest points in images for agent navigation can be matched by using pixel patches from the visual image for the interest points in the depth map, as in block 450. The interest points in a navigation image can be matched to interest points in a visual image from a database using pixel patches extracted from the visual image to identify the agent's current location within a navigation graph.

Using the visual pixel patches from navigation images for an agent is an effective matching method because the visual pixel patches also identify areas of interest in the depth images where there is high gradient. In addition, a depth map is a subset of what is interesting visually in an image. The areas of interest have a high gradient and generally have a visual texture that can be used for effective matching. As a result, this configuration can use a pixel patch from visual image in and/or around areas of interest in the depth map for matching features of interest.

In another illumination invariant configuration, the depth images and visual images can be stored in separate situation image sets. For example, one index of color visual images grouped as situation image sets can be stored and a second separate index of depth images grouped as situation image sets can be stored separately from the visual images. Then the matching can take place with either depth images or visual images depending on which situation image set type has an error value below a defined threshold. As a result, when a scene illumination has changed, the system can automatically pick a situation image set from either the depth image type or visual image types that are matching the best. Alternatively, the matching process can also be made more light invariant by using just the depth images to avoid changes in time of day, weather, or artificial lighting.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A system for change invariant scene recognition of an environment by an agent, the system comprising:
   an image camera configured to use image sensors to capture images for the agent;
   a grouping module configured to group the images into situation image sets that are identified as being at locations and edges of a navigation graph;
   an image database configured to contain the situation image sets;
   a query module configured to query the image database by comparing a first image signature of a navigation image with second image signatures of the situation image sets, wherein the situation image sets are loaded as separate sets from the image database;
   a probability module configured to identify a selected situation image set based on a probability that the selected situation image set has an individual image that matches the navigation image;
   a feature matching module configured to identify one or more matching images in the selected situation image set that match the navigation image and to provide a navigation location for the agent based on the one or more matching images; and
   at least one processing device configured to execute the grouping module, the query module, the probability module, and the feature matching module.

2. The system as in claim 1, wherein the images are grayscale depth images or visual images.

3. The system as in claim 1, wherein the first image signature and the second image signatures are global image signatures.

4. The system as in claim 1, wherein the agent is a robotic agent having a navigation module configured to navigate from the navigation location to another navigation location.

5. The system as in claim 1, further comprising a pruning module configured to remove some situation image sets from the image database when the some situation image sets have not been used in navigation for a period of time, wherein the at least one processing device is also configured to execute the pruning module.

6. The system as in claim 1, wherein the probability module is further configured to:
   determine the probability that the selected situation image set has the individual image that matches the navigation image; and determine other probabilities that other situation image sets have other individual images that match the navigation image,
wherein the probability for the selected situation image set is higher than the other probabilities for the other situation image sets.

7. A method implemented by one or more computer processing devices, the method comprising:
obtaining images for an agent, the images being captured with a camera;
grouping the images into situation image sets and storing the situation image sets in an image database;
querying the image database for first image signatures of the situation image sets and comparing the first image signatures to a second image signature of a navigation image;
based on the comparing, determining probabilities that individual situation image sets of the situation image sets have individual images that match the navigation image;
identifying a selected situation image set based on the probabilities;
identifying one or more matching images in the selected situation image set that match the navigation image; and
providing a navigation location for the agent based on the one or more matching images.

8. The method as in claim 7, wherein the situation image sets are associated with corresponding locations and edges of a navigation graph.

9. The method as in claim 7, wherein the situation image sets are associated with corresponding locations.

10. The method as in claim 7, wherein:
the grouping further comprises grouping the images within the situation image sets into subsets of the situation image sets based on a time of day or based on weather conditions; and
the determining the probabilities further comprises determining the probabilities for the subsets.

11. The method as in claim 7, wherein the image database is a relational database or an object-oriented database.

12. The method as in claim 7, wherein the determining the probabilities further comprises computing error values between the first image signatures of the situation image sets and the second image signature of the navigation image and basing the probabilities on the error values.

13. The method as in claim 12, the method further comprising excluding some situation image sets having corresponding error values above a predetermined threshold when identifying the selected situation image set.

14. The method as in claim 7, the method further comprising iteratively performing the querying, the determining, and the identifying the selected situation image set until the one or more matching images are found.

15. One or more computer readable memory devices or storage devices storing computer readable instructions that, when executed by one or more processing devices, cause the one or more processing devices to perform acts comprising:
obtaining images for an agent, wherein the images were captured with an image camera using one or more image sensors;
grouping the images into situation image sets corresponding to locations of a navigation graph and storing the situation image sets in an image database;
comparing situation image signatures of the situation image sets to one or more navigation image signatures of a navigation image; and
identifying a selected situation image set based on a corresponding probability that the selected situation image set has an individual image that matches the navigation image.

16. The one or more computer readable memory devices or storage devices as in claim 15, wherein the comparing further comprises comparing a global navigation image signature associated with the navigation image to global situation image signatures associated with the situation image sets.

17. The one or more computer readable memory devices or storage devices as in claim 16, wherein the comparing the global navigation image signature and the global situation image signatures produces a subset of the situation image sets for further comparison.

18. The one or more computer readable memory devices or storage devices as in claim 17, the acts further comprising performing the further comparison by comparing higher granularity features associated with the navigation image to corresponding higher granularity features associated with other images in the subset of the situation image sets.

19. The one or more computer readable memory devices or storage devices as in claim 15, the acts further comprising:
identifying one or more matching images in the selected situation image set that match the navigation image; and
providing a navigation location for the agent based on the one or more matching images.

20. The one or more computer readable memory devices or storage devices as in claim 15, the acts further comprising:
computing error values between the situation image signatures of the situation image sets and the one or more navigation image signatures of the navigation image; and
determining a set of probabilities based on the error values, the set of probabilities including the corresponding probability,
wherein the identifying the selected situation image set further comprises comparing the corresponding probability to other probabilities from the set of probabilities.

* * * * *